United States Patent
Zhang et al.

(10) Patent No.: US 9,380,044 B2
(45) Date of Patent: Jun. 28, 2016

(54) SUPPORTING DIFFERENTIATED SECURE COMMUNICATIONS AMONG HETEROGENEOUS ELECTRONIC DEVICES

(71) Applicant: Cisco Technology, Inc., San Jose, CA (US)

(72) Inventors: Tao Zhang, Fort Lee, NJ (US); Helder Antunes, Morgan Hill, CA (US); Aaron Lung, San Jose, CA (US); Chintan Patel, Kirkland, WA (US); Ajith Thrivikramannair, Milpitas, CA (US); Akshay Singhal, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/482,052

(22) Filed: Sep. 10, 2014

(65) Prior Publication Data
US 2016/0072781 A1    Mar. 10, 2016

(51) Int. Cl.
*H04L 9/00*      (2006.01)
*H04L 29/06*     (2006.01)
*H04L 29/08*     (2006.01)

(52) U.S. Cl.
CPC ............ *H04L 63/08* (2013.01); *H04L 67/1044* (2013.01); *H04L 67/28* (2013.01)

(58) Field of Classification Search
CPC ....... H04L 9/08; H04L 9/0805; H04L 9/0811; H04L 9/081; H04L 9/0819; H04L 9/0838; H04L 9/0861; H04L 63/08; H04L 63/0853; H04L 63/08696
USPC .................... 380/277, 44; 713/168, 169, 171; 726/2–26
See application file for complete search history.

(56) References Cited

U.S. PATENT DOCUMENTS

| | | | |
|---|---|---|---|
| 6,985,089 B2 | 1/2006 | Liu et al. | |
| 7,181,620 B1 * | 2/2007 | Hur | H04L 9/083 713/168 |
| 7,904,945 B2 * | 3/2011 | Zheng | H04L 63/08 726/11 |
| 7,936,878 B2 * | 5/2011 | Kune | H04L 63/062 380/270 |
| 8,452,969 B2 | 5/2013 | Iyer et al. | |
| 8,464,060 B2 * | 6/2013 | Yao | H04L 9/3218 380/255 |
| 8,514,825 B1 | 8/2013 | Addepalli et al. | |
| 8,559,537 B2 | 10/2013 | Fernandez et al. | |

(Continued)

OTHER PUBLICATIONS

Kartik Krishnan, "Symmetric Key cryptosystem", SFWR 4C03: Computer Networks and Computer Security, Mar. 2004, pp. 22-24-1-22-24-19.

(Continued)

*Primary Examiner* — Hosuk Song
(74) *Attorney, Agent, or Firm* — Patterson + Sheridan LLP

(57) ABSTRACT

A gateway apparatus supports differentiated secure communications among heterogeneous electronic devices. A communication port communicates via communication networks of different types with two or more associated devices having diverse secure communication capabilities. The gateway logic selectively authenticates the associated devices for group membership into a Secure Communication Group (SCG), and selectively communicates Secure Communication Group Keys (SCGKs) to the devices having the diverse secure communication capabilities for selectively generating session keys locally by the associated devices for mutual secure communication in accordance with the group membership of the associated devices in the SCG.

21 Claims, 15 Drawing Sheets

(56) References Cited

U.S. PATENT DOCUMENTS

| | | | |
|---|---|---|---|
| 8,850,203 B2 * | 9/2014 | Sundaram | H04L 9/0825 380/282 |
| 2007/0005197 A1 | 1/2007 | Ito et al. | |
| 2011/0128902 A1 | 6/2011 | Guo | |

OTHER PUBLICATIONS

Ayushi, "A Symmetric Key Cryptographic Algorithm", International Journal of Computer Applications, vol. 1, No. 15, 2010, pp. 1-4.

* cited by examiner

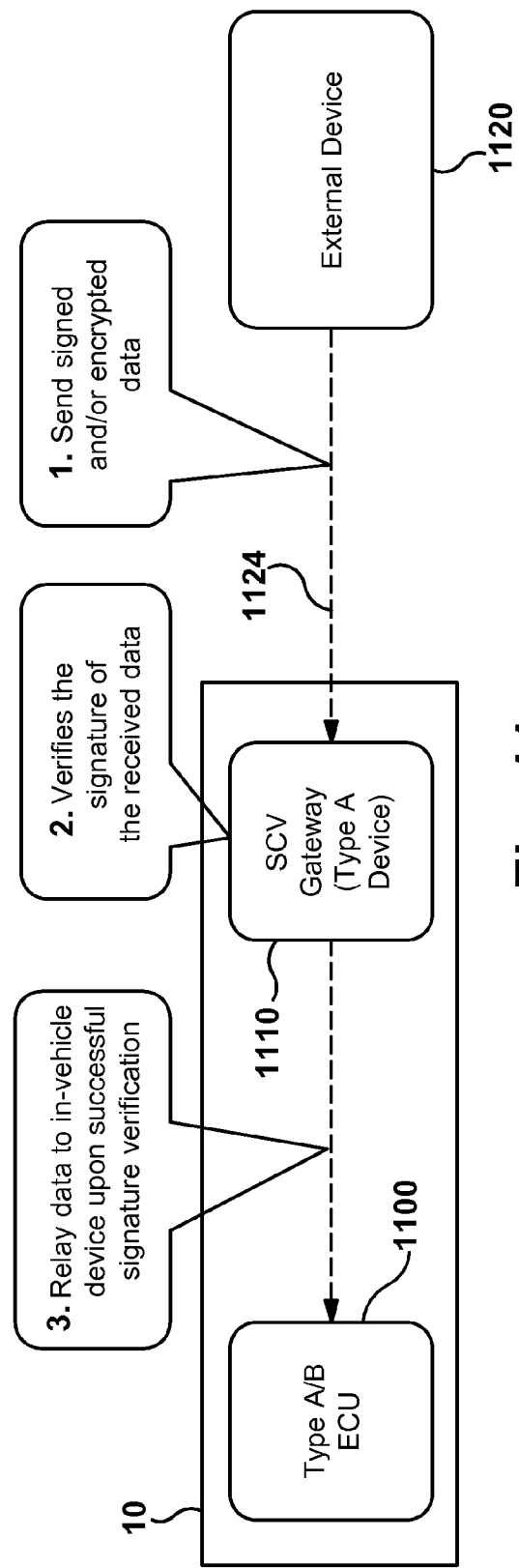

SUPPORTING DIFFERENTIATED SECURE COMMUNICATIONS AMONG HETEROGENEOUS ELECTRONIC DEVICES

TECHNICAL FIELD

The present disclosure relates generally to systems supporting interoperability of devices having unequal capabilities such as for example in-vehicle electronic sensors and devices, automation devices such as industrial floor and home automation devices, and any other networked electronic devices having varying different communication and processing capabilities.

BACKGROUND

Modern vehicles such as cars and trucks typically use many networked electronic devices ranging from simple sensors generating various feedback signal messages to more complicated Electronic Control Units (ECUs) consisting of microcontrollers and microcomputers for control of vehicle systems and operations, to support communication between the vehicle and systems external to the vehicle, and provide applications to users. Security capabilities are important to these devices for protection of in-vehicle message integrity and confidentiality, protection against message reply attacks, and for device authentication. These same security capabilities are also important when in-vehicle devices are communicating with an authenticated server external to the vehicle such as for example external diagnostic equipment, brought-in devices, and remote telemetry systems. The original devices on a vehicle are very often authenticated or assumed to be authentic during device or vehicle manufacturing process. However, no provisions are made for further device authentication or for further security key derivation or distribution to be performed after the vehicle leaves the manufacturing plant.

In-vehicle device authentication systems that support widely diverse in-vehicle devices over heterogeneous networks are unavailable. For example, since Controller Area Network (CAN) buses do not provide device authentication mechanisms, application-layer authentication mechanisms such as the seed-key method have been used to control access to ECU firmware from external diagnostic tools for ECU firmware updates. These application-layer authentication mechanisms, however, cannot support authentication of all types of in-vehicle networks, especially devices that only send but not receive data (e.g., sensors) and devices that are incapable of performing sophisticated cryptographic operations. Various authentication tools for in-vehicle Ethernet networks are limited to supporting device authentication at the Ethernet MAC layer. Therefore, the application layer and network-specific authentication and security key generation and distribution protocols are unable to provide for authentication of in-vehicle electronic devices having varying different communication and processing capabilities.

BRIEF DESCRIPTION OF THE DRAWINGS

The accompanying drawings incorporated herein and forming a part of the specification illustrate the example embodiments.

The accompanying drawings incorporated herein and forming a part of the specification illustrate the example embodiments.

FIG. 11c is a flow diagram illustrating a secure message exchange between an in-vehicle device of the system of FIG. 1 with an associated external device using an end-to-end secure communication model with optional encryption.

DESCRIPTION OF EXAMPLE EMBODIMENTS

Overview

Figure 1:
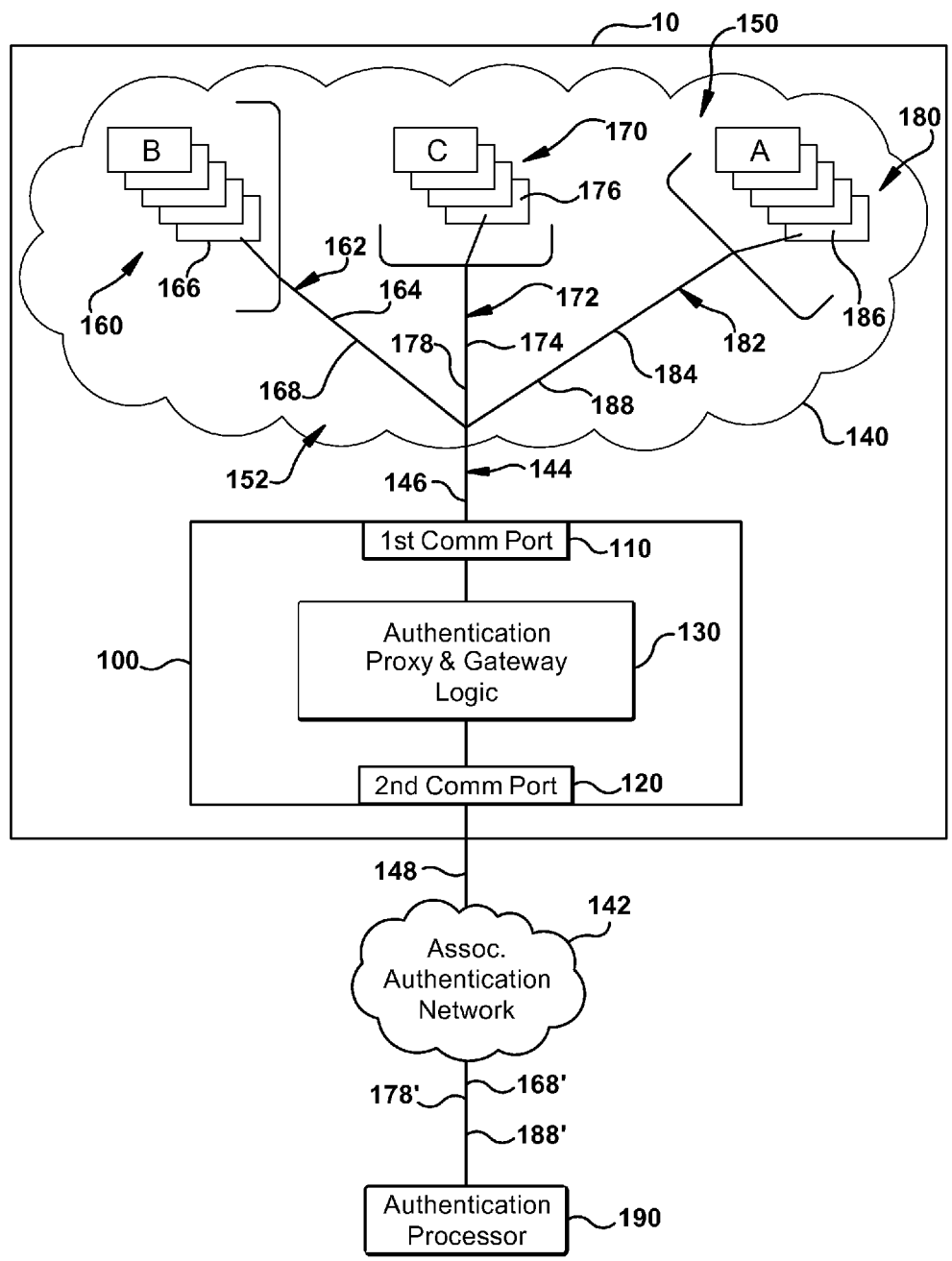
FIG. 1 is a simplified block diagram illustrating a system for authenticating and supporting secure communications among heterogeneous electronic devices such as for supporting in-vehicle electronic devices having varying different communication and processing capabilities.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Overall, in accordance with example embodiments herein, apparatus, methods and logic encoded in one or more tangible non-transient computer readable media for execution by a processor and when executed by the processor, the logic, the apparatus, and the methods are operable to locally authenticate and coordinate distribution of security keys among in-vehicle devices that have different and potentially vastly different computing and communication capabilities, thereby supporting network inclusion of devices with diverse capabilities such as devices that can only send but not receive data, devices that can perform only symmetric-key cryptographic operations but not public-key algorithms, devices that do not support Internet Protocols (IP), and devices that support sophisticated security algorithms and IP-based security protocols. The embodiments herein allow in-vehicle devices to use different individualized authentication and secure communication methods that match their own particular capabilities and, further, the embodiments herein also support devices attached to different types of in-vehicle and/or off-vehicle networks (e.g., CAN, LIN, MOST, and Ethernet).

In accordance with example embodiments herein, apparatus, methods and logic encoded in one or more tangible non-transient computer readable media for execution by a processor and, the apparatus, methods and logic when executed by the processor, are operable to communicate by a communication port of a gateway apparatus via an associated first communication network of a first network type with a first associated device having a first secure communication capability, and communicate by the communication port of the gateway apparatus via an associated second communication network of a second network type different than the first network type with a second associated device having a second secure communication capability different than the first secure communication capability. The first associated device is selectively authenticated by the gateway logic for group membership into a first Secure Communication Group (SCG). The second associated device is selectively authenticated by the gateway logic for group membership into the first SCG. Secure Communication Group Keys (SCGKs) are selectively communicated by the gateway logic to the first associated device having the first secure communication capability and to the second associated device having the second secure communication capability for locally generating by the first and second associated devices session keys for mutual secure communication in accordance with the group membership of the first and second associated devices in the first SCG.

Yet still further in accordance with example embodiments herein, a gateway apparatus supports differentiated secure communications among heterogeneous electronic devices. The gateway apparatus includes a first communication port and gateway logic operatively coupled with the first communication port. The first communication port is configured to communicate via an associated first communication network of a first network type with a first associated device having a first secure communication capability. The first communication port further configured to communicate via an associated second communication network of a second network type different than the first network type with a second associated device having a second secure communication capability different than the first secure communication capability. The gateway logic selectively authenticates the first associated device for group membership into a first SCG, and selectively also authenticates the second associated device for group membership into the first SCG. The gateway logic selectively communicates SCGKs to the first associated device having the first secure communication capability and to the second associated device having the second secure communication capability for generating session keys by the first and second associated devices for mutual secure communication in accordance with the group membership of the first and second associated devices in the first SCG.

DETAILED DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

With reference now to the drawing figures, wherein the showings are for purposes of illustrating example embodiments only and not for purposes of limiting same, FIG. 1 illustrates an apparatus 100 disposed in an associated vehicle 10 for supporting differentiated secure communications among a plurality of associated network devices 150 having unequal communication capabilities. The apparatus 100 includes, in the example embodiment, a first communication port 110 configured to communicate via an associated communication network 140 with the plurality of associated network devices 150, a second communication port 120 configured to communicate via an associated authentication network 142 with an associated authentication processor 190, and communication gateway and authentication proxy logic 130 operatively coupled with the first and second communication ports 110, 120. "Logic" and/or "module" as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSoC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In accordance with the embodiments herein, the apparatus 100 is configured to locally authenticate and to selectively distribute secure communication keys to in-vehicle devices 152 having vastly different computing and communication capabilities, including devices that can only send but not receive messages such as simple sensors or the like, devices that are capable of performing only symmetric-key cryptographic operations and not public-key algorithms, devices that do not support IP protocols, and devices that support sophisticated security algorithms and IP-based security protocols. In addition, the apparatus 100 is configured to locally authenticate in-vehicle devices using different authentication methods that match the respective capabilities of the various devices 152. Yet still further, the apparatus 100 is configured to locally authenticate and to selectively distribute the secure communication keys to the in-vehicle devices 152 capable of receiving messages and which may be attached to different physical types of networks (e.g., CAN, LIN, MOST, and Ethernet) comprising the associated communication network 140. In accordance with the example embodiment, the in-vehicle devices 152 are classified to allow devices with different capabilities to use different authentication and communication key usage and distribution procedures based on their communication and cryptographic processing capabilities, as illustrated in FIG. 1.

A first set ("Type B" devices) of associated network devices 160 in the example embodiment has a first authentication and secure communication capability wherein the in-vehicle electronic devices of the first set 160 have bidirectional communication capability and are capable of supporting only symmetric-key cryptography. The apparatus 100 is in operative communication with the first set of devices 160 via the first communication port 110 using the associated communication network 140. Similarly, a second set ("Type C" devices) of associated network devices 170 in the example embodiment has a second authentication and secure communication capability wherein the in-vehicle electronic devices of the second set 170 can send but not receive messages, and are capable of supporting only symmetric-key cryptography. The apparatus 100 is in operative communication with the second set of devices 170 via the first communication port 110 using the associated communication network 140. The devices of the second set (Type C) of associated network devices 170 are, in the example embodiment, simple electronic sensor devices or the like, capable of only transmitting encrypted messages representative of a measure of the parameter being sensed, for example. The messages containing the measurement or other data may for security or other reasons be signed by the devices of the second set of associated network devices 170 prior to sending the messages using a digital signature or the like. Lastly in the example embodiment, a third set ("Type A" devices) of associated network devices 180 in the example embodiment has a third authentication and secure communication capability wherein the in-vehicle electronic devices of the third set 180 have bidirectional communication capability and are capable of supporting both public-key and symmetric-key cryptography. The apparatus 100 is in operative communication with the third set of devices 180 via the first communication port 110 using the associated communication network 140.

Overall, the first communication port 110 receives signals 144 comprising authentication request data 146 representative of requests for authentication from one or more of the network devices 152. The signals may also contain security keys communicated from one or more of the in-vehicle devices 152 for selective distribution by the gateway logic 130 to others of the in-vehicle devices 152. The authentication proxy and gateway logic 130 selectively authenticates the network devices 152 based on the authentication request data in accordance with the authentication capability of the associated requesting device. Once authenticated, the devices may be able to share security keys with other authenticated devices, and further may also receive from the gateway logic security keys of other previously authenticated devices. The authentication proxy logic adapts its authentication and key distribution response in accordance with the particular communication and processing capabilities of the authentication-requesting device. For some devices such as the second set (Type C) of associated network devices 170 capable of only transmitting signed or otherwise encrypted messages representative of a measure of the parameter being sensed, for example, the authentication proxy logic intercepts the messages and interprets them as authentication requests if the device is not already authenticated. The authentication proxy and gateway logic selectively generates a cryptographic key set responsive to the authentication proxy logic authenticating the network devices based on the authentication request data in accordance with the particular authentication capability of the requesting device. Thereafter, the authentication proxy logic selectively distributes the cryptographic key set to selected one or more of the network devices.

In addition to the above, in the example embodiment in general, the authentication proxy logic 130 selectively forwards the authentication request data 146 to the associated authentication processor 190 by the second communication port 120 via the associated authentication network 142 responsive to the authentication proxy logic 130 failing to locally authenticate the authentication-requesting associated network device. The authentication proxy logic 130 selectively receives a first cryptographic key set 148 by the second communication port 120 via the associated authentication network 142 responsive to the associated authentication processor 190 authenticating the authentication-requesting associated network device. Thereafter, the authentication proxy logic 130 selectively distributes the first cryptographic key set 148 to the appropriate one or more associated in-vehicle network devices 150.

In a particular example embodiment and with continued reference to FIG. 1, the first communication port 110 receives a first signal 162 comprising first authentication request data 164 representative of a request for authentication from at least one 166 of the first set of network devices 160 having the first authentication and secure communication capability, and receives a second signal 172 comprising second authentication request data 174 representative of a request for authentication from at least one 176 of the second set of network devices 170 having the second authentication and secure communication capability different than the first authentication and secure communication capability. The authentication proxy logic 130 selectively authenticates the at least one 166 of the first set of network devices 160 based on the first authentication request data 164 in accordance with the first authentication and secure communication capability, and selectively authenticates the at least one 176 of the second set of network devices 170 based on the second authentication request data 174 in accordance with the second authentication and secure communication capability different than the first authentication and secure communication capability.

Figure 9:
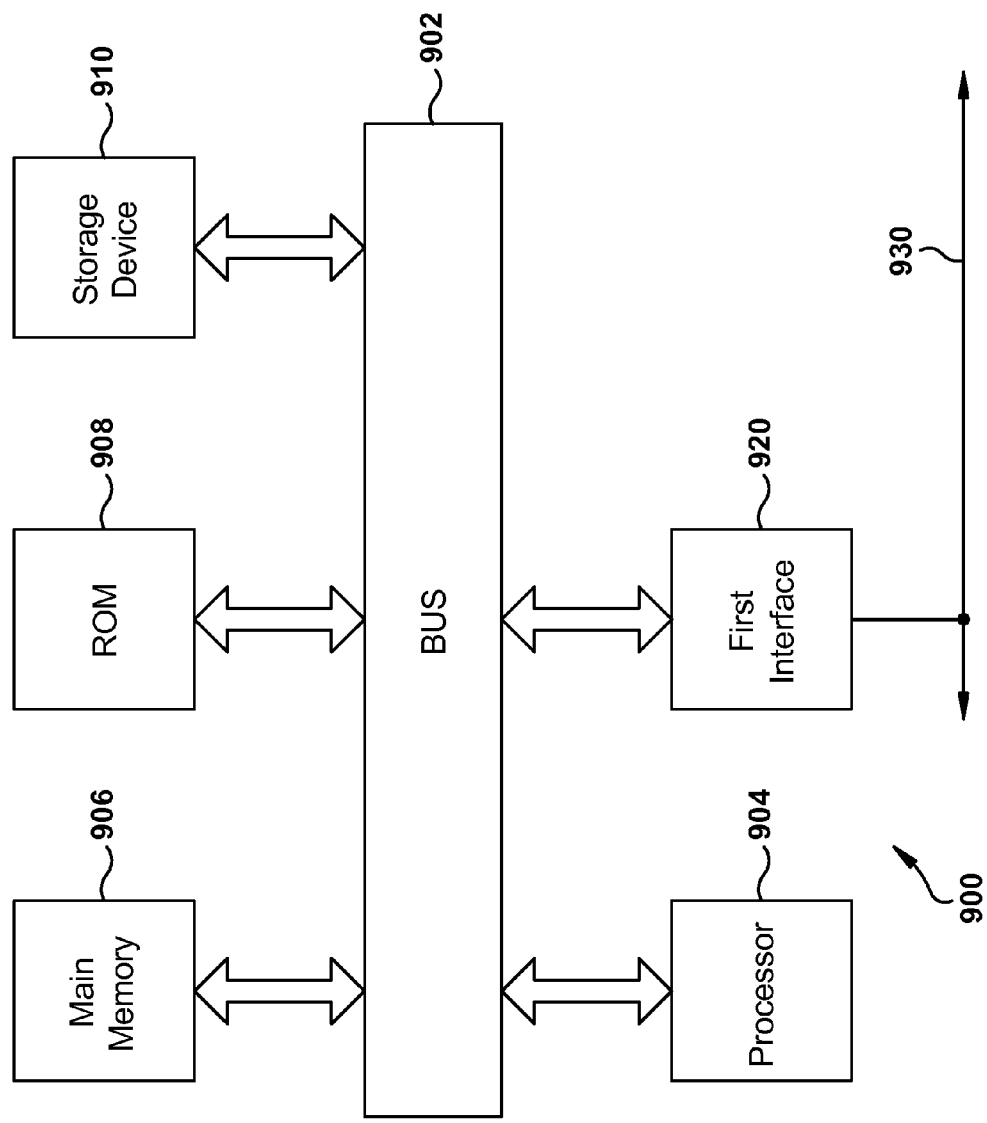
FIG. 9 is a block diagram illustrating an example of a computer system upon which an example embodiment can be implemented.

In the example embodiment, since the second set of network devices 170 are capable of only sending but not receiving messages, but are capable of supporting symmetric-key cryptography, the authentication proxy and gateway logic 130 of the example embodiment selectively distributes the first cryptographic key set 168 to the first set of network devices 160, and selectively also distributes the second cryptographic key set 178 to the first set of network devices 160. The authentication proxy logic 130 of the example embodiment also selectively distributes the first and second cryptographic key sets 168, 178 to the third set of network devices 180 as may be necessary or desired for the third set of network devices 180 to communicate with the first and second sets of network devices 160, 170. In the example embodiment, the authentication proxy and gateway logic 130 stores the first and second cryptographic key sets 168, 178 in a non-transient memory (FIG. 9).

In addition to the above, in the example embodiment, the authentication proxy and gateway logic 130 selectively forwards the first authentication request data 164 to the associated authentication processor 190 by the second communication port 120 via the associated authentication network 142 responsive to the authentication proxy logic 130 failing to locally authenticate the at least one 166 of the first set of network devices 160 based on the first authentication request data 164 in accordance with the first authentication and secure communication capability. The authentication proxy logic 130 selectively receives a first cryptographic key set 168' by the second communication port 120 via the associated authentication network 142 responsive to the associated authentication processor 190 authenticating the at least one 166 of the first set of network devices 160 based on the first authentication request data 164. Thereafter, the authentication proxy logic 130 selectively distributes the received first cryptographic key 168' set to the first set of network devices 160.

Still further in addition to the above, in the example embodiment, the authentication proxy logic 130 selectively forwards the second authentication request data 174 to the associated authentication processor 190 by the second communication port 120 via the associated authentication network 142 responsive to the authentication proxy logic 130 failing to locally authenticate the at least one 176 of the second set of network devices 170 based on the second authentication request data 174 in accordance with the second authentication and secure communication capability. The authentication proxy logic 130 selectively receives a second cryptographic key set 178' by the second communication port 120 via the associated authentication network 142 responsive to the associated authentication processor 190 authenticating the at least one 176 of the second set of network devices 170 based on the second authentication request data 174. Thereafter, the authentication proxy logic 130 selectively distributes the second cryptographic key set 178' to the first set of network devices 160. The second cryptographic key set 178' is not distributed to the second set of network devices 170 because, as noted above, in the example embodiment, the second set of network devices 170 are capable of only sending but not receiving messages. In the example embodiment, the authentication proxy logic 130 may also selectively distribute the second cryptographic key set 178' to the third set of network devices 180 as may be necessary or desired for the third set of network devices 180 to communicate with the first and second sets of network devices 160, 170.

Figure 2A:
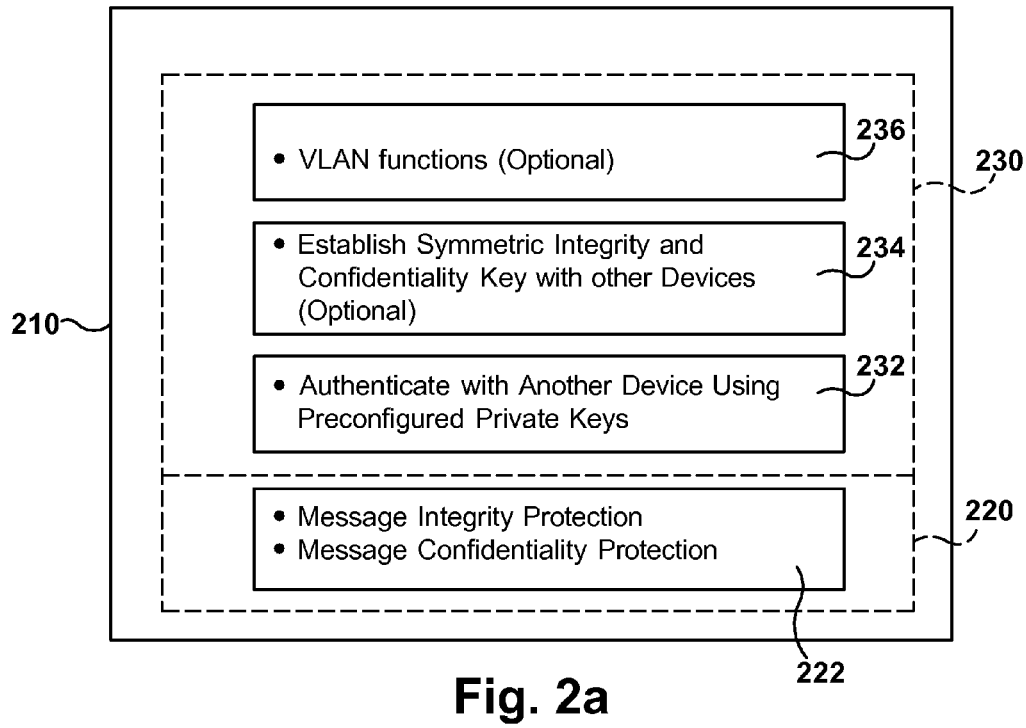
FIG. 2a is an illustration of a capabilities block showing communication and processing capabilities of a first set of the in-vehicle devices of FIG. 1.

As noted above, the first set (Type B) of associated network devices 160 in the example embodiment has an overall first authentication capability wherein the in-vehicle electronic devices of the first set 160 have bidirectional communication capability and are capable of supporting only symmetric-key cryptography. FIG. 2a shows a capability block 210 of the first set 160 of devices defining capabilities of the first set 160 of devices such as processing and communication capabilities for example. The capabilities block 210 of the first set 160 of devices includes a first tier set 220 of processing and communication capabilities, and a second tier set 230 of processing and communication capabilities. In the example embodiment the first tier set 220 of processing and communication capabilities includes message integrity and confidentiality protection processing and communication capabilities 222. Also in the example embodiment the second tier set 230 of capabilities includes processing and communication capabilities for authenticating with other devices using preconfigured private keys 232, processing and communication capabilities for establishing symmetric integrity and confidentiality keys with other devices 234, and processing and communication capabilities for performing virtual local area network (VLAN) functions 236.

Figure 2B:
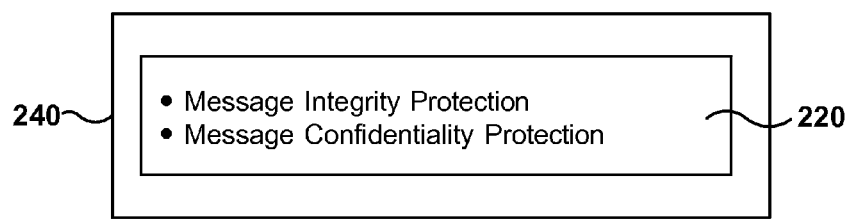
FIG. 2b is an illustration of a capabilities block showing communication and processing capabilities of a second set of the in-vehicle devices of FIG. 1.

Similarly, the second set (Type C) of associated network devices 170 in the example embodiment has an overall second authentication and secure communication capability wherein the in-vehicle electronic devices of the second set 170 can send but not receive messages, and are capable of supporting only symmetric-key cryptography. The second set (Type C) of associated network devices 170 are, in the example embodiment, simple sensor devices or the like, capable of only transmitting encrypted messages representative of a measure of the parameter being sensed such as vehicle speed, acceleration or altitude, for example. FIG. 2b shows a capabilities block 240 of the second set 170 of devices defining capabilities of the second set 170 of devices such as processing and communication capabilities for example. The capabilities block 240 of the second set 170 of devices includes the first tier set 220 of processing and communication capabilities of the first set 160 of devices. In the example embodiment the first tier set 220 of processing and communication capabilities includes message integrity and confidentiality protection processing and communication capabilities 222. Although the first tier set 220 of processing and communication capabilities are the same as between the first and second sets of network devices 160, 170 in the example embodiment, they may be different in other embodiments.

Figure 2C:
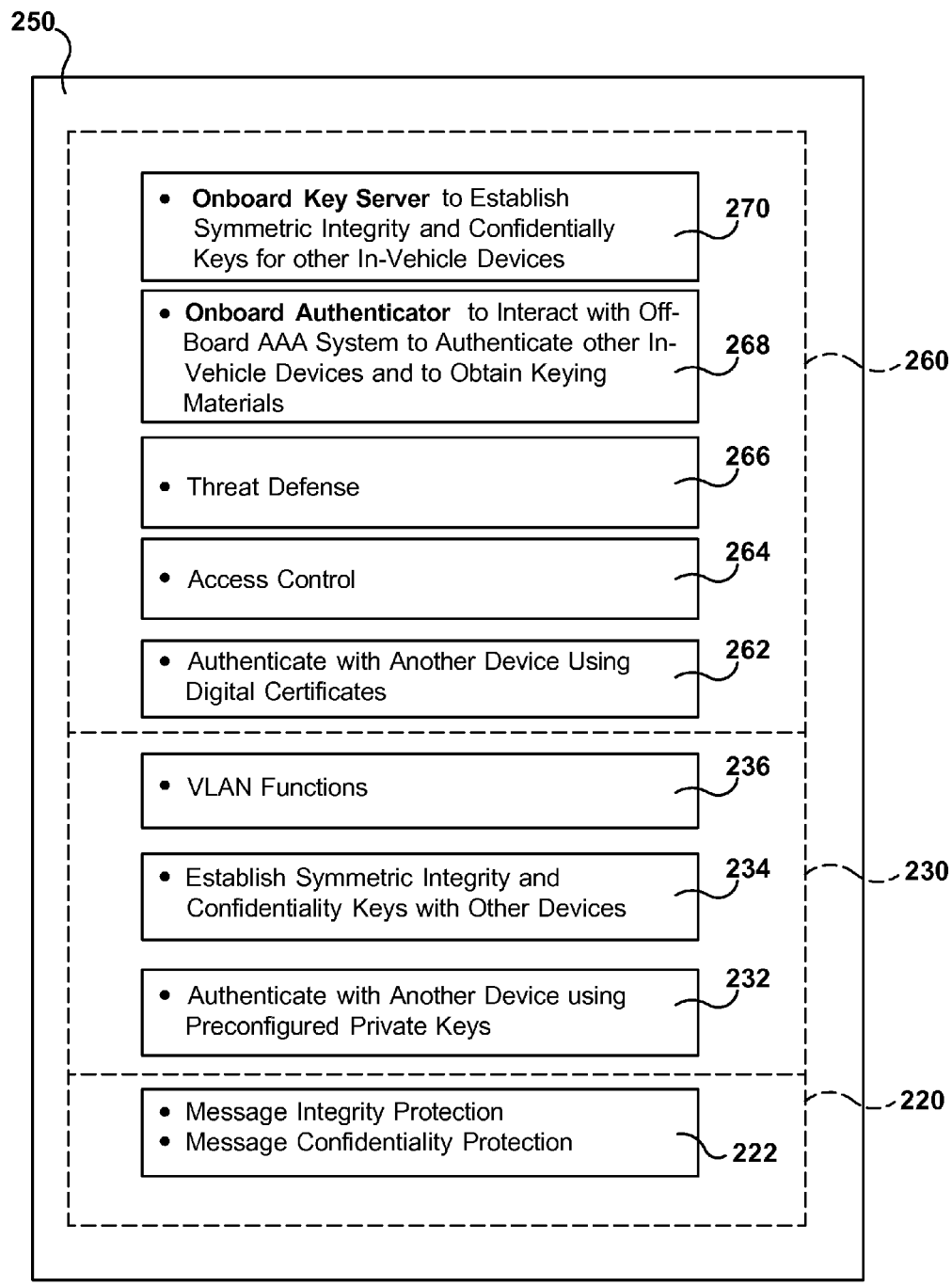
FIG. 2c is an illustration of a capabilities block showing communication and processing capabilities of a third set of the in-vehicle devices of FIG. 1.

Lastly in the example embodiment, the third set (Type A) of associated network devices 180 in the example embodiment has an overall third authentication and secure communication capability wherein the in-vehicle electronic devices of the third set 180 have bidirectional communication capability and are capable of supporting both public-key and symmetric-key cryptography. As shown in FIG. 2c, a capabilities block 250 of the third set 180 of devices defines capabilities of the third set 180 of devices such as processing and communication capabilities for example. The capabilities block 250 of the third set 170 of devices includes the first tier set 220 of processing and communication capabilities of the first and second sets 160, 170 of devices, the second tier set 230 of processing and communication capabilities of the second set 170 of devices unavailable to the first set 160 of devices, and a third tier set 260 of processing and communication capabilities unavailable to the first and second sets 160, 170 of devices. In the example embodiment the third tier set 260 of processing and communication capabilities includes authentication using digital certificates processing and communication capabilities 262, access control processing and communication capabilities 264, threat defense processing and communication capabilities 266, onboard authentication processing and communication capabilities 268, and onboard key server processing and communication capabilities 270. Although the first and second tier sets 220, 230 of processing and communication capabilities are the same as between the second and third sets of network devices 170, 180 in the example embodiment; they may be different in other embodiments.

Figure 3:
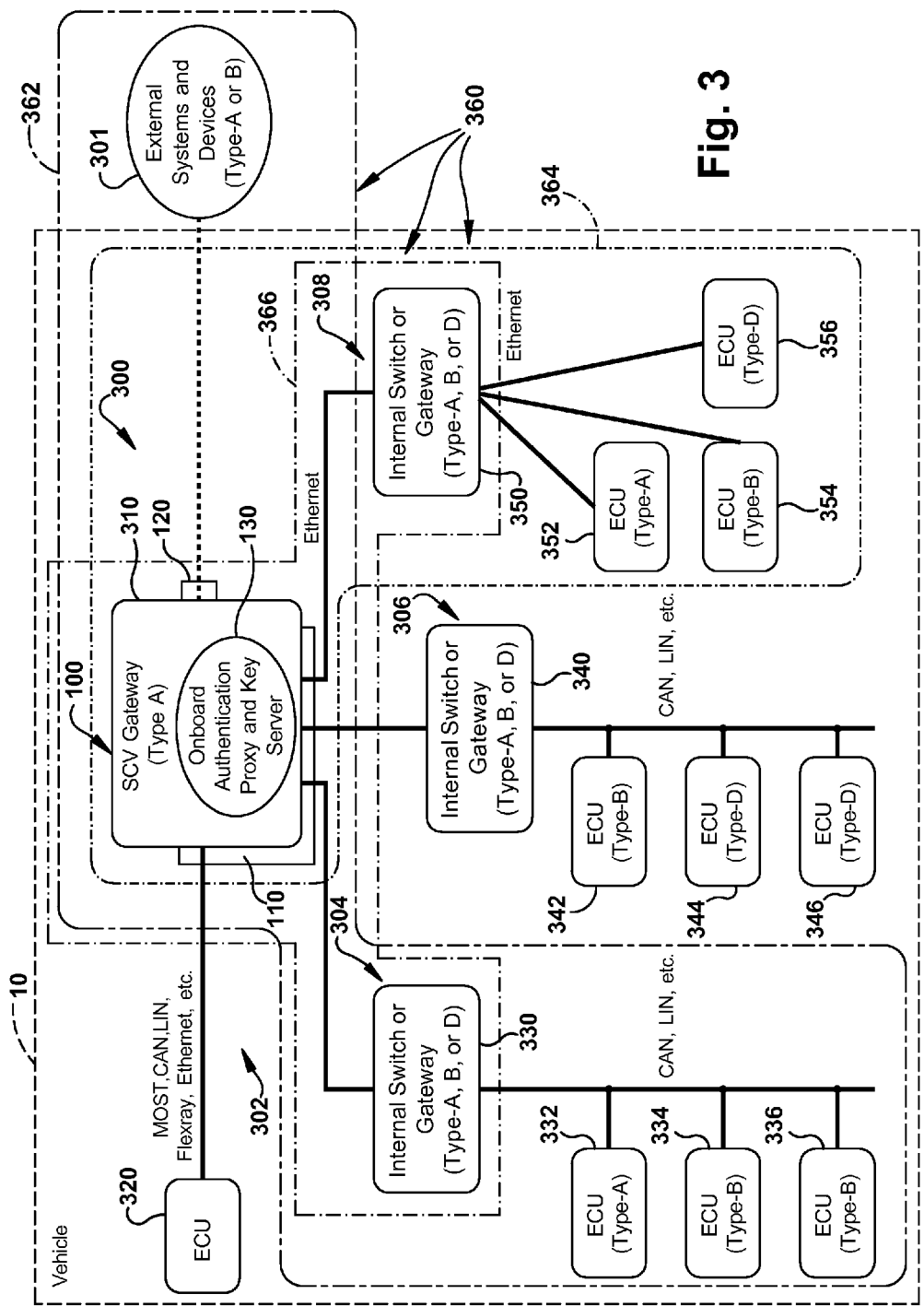
FIG. 3 is a schematic diagram illustrating a simplified configuration of a network having several different physical sub-networks within an associated vehicle and using a set of secure communication groups formed by the network.

FIG. 3 is a schematic diagram illustrating a simplified configuration of a network 300 having several sub-networks 302, 304, 306, and 308 within a vehicle 10 wherein a selected one 310 of the third set of network devices 180 is functionally operable in the capacity of the apparatus 100 (FIG. 1) for authenticating a plurality of associated network devices having unequal communication capabilities described above in connection with FIG. 1. The illustrated embodiment demonstrates an example showing a manner in which different electronic devices within an associated vehicle 10 can be implemented as different types of in-vehicle network devices for providing authentication of the in-vehicle electronic devices having the different communication and processing capabilities. In particular, in the example shown, a selected one 310 of the third set of network devices 180 is functionally operable in the capacity of the network gateway apparatus 100 described above in connection with FIG. 1 as a connected vehicle gateway for authenticating the plurality of associated network devices having the unequal communication and secure communication capabilities and for selectively distributing network security keys to the devices as necessary or desired thereby supporting differentiated secure communications among the plurality of associated network devices 150 having unequal communication capabilities. In the example embodiment illustrated, the first sub-network 302 is locally homogenous and includes an electronic control unit (ECU) 320 of the associated vehicle 10 wherein the ECU 320 is in operative communication with the connected vehicle gateway device 310 and wherein the network device 310 is a member of the third set of network devices 180. The second, third and fourth sub-networks 304, 306, and 308 are operatively coupled with the connected vehicle gateway network device 310 and each includes, respectively, an internal switch or gateway device 330, 340, and 350. It is to be appreciated that the internal switch or gateway devices 330, 340, and 350 may be implemented, according to the example, as devices selected from one or more of the first or third sets of network devices 160, 180. In addition, each subsystem or network domain 302, 304, 306, and 308 within the associated vehicle 10 can contain any combination of devices selected from the first, second or third sets of network devices 160, 170, and 180.

In the example embodiment shown in FIG. 3, the second sub-network 304 is a locally homogenous CAN, LIN, or other network and includes a first ECU 332 having communication and processing capabilities of the third set of network devices 180, a second ECU 334 having communication and processing capabilities of the first set of network devices 160, and a third ECU 336 having communication and processing capabilities of the first set of network devices 160. Similarly, the third sub-network 306 is a locally homogenous CAN, LIN, or other network and includes a first ECU 342 having communication and processing capabilities of the first set of network devices 160, a second ECU 344 having communication and processing capabilities of the second set of network devices 170, and a third ECU 346 having communication and processing capabilities of the second set of network devices 170. Lastly in the example embodiment shown in FIG. 3, the fourth sub-network 308 is an Ethernet network and includes a first ECU 352 having communication and processing capabilities of the third set of network devices 180, a second ECU 354 having communication and processing capabilities of the first set of network devices 160, and a third ECU 356 having communication and processing capabilities of the second set of network devices 170.

In accordance with the embodiments herein, with regard to security key management, a collection of session keys is developed, stored in a non-transient memory of the gateway device 310, and selectively distributed by the gateway device to the associated network devices 150. The session keys used to protect data to be communicated from a type-x device to a type-y device will be referred to herein as "X-to-Y session keys" or "X-to-Y keys." The X-to-Y keys may be allowed to be different from the Y-to-X keys. For example, larger keys can be used between devices among the third set of network devices 180 (Type-A) than between devices among the first set of network devices 160 (Type-B). In an embodiment, the B-to-A session keys for some Type-B devices can be larger than for other Type-B devices to allow messages from selected Type-B devices to have a higher level of protection than messages from other Type-B devices.

In the example embodiment illustrated, each device is preconfigured with a set of permanent keys used to bootstrap its security operations. These permanent keys can be, for example, a set of public-private key pairs and their certificates for the third set (Type-A) of network devices 180, and a set of private master private keys for any other type of device. Each device may also be provisioned in an embodiment with an authentication token wherein, in the example embodiment the authentication token is an encrypted data object that the device can use to authenticate itself with the onboard authentication proxy logic 130.

In accordance with the embodiments herein, multiple in-vehicle devices selectively form one or more secure communication groups and use one or more corresponding common set(s) of group keys to generate their session keys for securing communications within each respective secure communication group. A group key of a device among the third set of network devices 180 (Type-A) contains keys for generating A-to-A keys, A-to-B, B-to-A, and C-to-A keys. A group key of a device among the first set of network devices 160 (Type-B) contains keys for generating B-to-A, A-to-B, and B-to-B keys. Lastly, a device among the second set of network devices 170 (Type-C) contains keys for generating C-to-A and C-to-B session keys.

In accordance with the embodiments herein, the devices establish their respective group keys as a result of successful device authentication. Different types of devices can use different methods to establish the group keys depending on the device's capabilities. For example, devices among the third set of network devices 180 (Type-A) may use public-key based key establishment protocols. Devices among the first set of network devices 160 (Type-B) can use preconfigured private keys and symmetric-key encryption to establish group keys or they can be given the group keys by the onboard key server portion 100 of the connected vehicle gateway network device 310. Lastly, device among the second set of network devices 170 (Type-C) can be preconfigured with group keys.

In order for establishing secure communications, each device needs to know the session keys for each of its communication peers. In accordance with the example embodiments herein, rather than the requirement that each device first discover its communication peers and then perform a key agreement protocol with each peer to establish the session keys, which requires every device to implement a peer discovery protocol and execute key establishment protocol with each peer and can be impractical for many in-vehicle devices with highly constrained computing and communication capabilities, the need for explicit peer discovery protocol is eliminated and the requirement of devices performing key establishment with each individual communication peer is eliminated. Instead, in accordance with the example embodiments herein, each device establishes the group keys as a result of its authentication with the onboard key server portion 100 of the connected vehicle gateway network device 310 and uses the group keys to locally generate and update its session keys. The onboard key server portion 100 of the connected vehicle gateway network device 310 obtains the C-to-B session keys and the C-to-A session keys from one or more off-board authentication servers 190 and distributes them to devices of the third and first sets (Types A and B) of associated network devices 180, 160 that need to receive messages from the devices of the second set (Type-C) of associated network devices 170.

In accordance with the embodiments herein, differentiated secure communications among heterogeneous electronic devices is provided first by authentication of in-vehicle devices having unequal capabilities such as for example having different communication and processing capabilities. In an example embodiment, a connected vehicle gateway device 310 is operable to function as the onboard authentication proxy logic 130 (FIG. 1) and includes onboard key server logic for authenticating other in-vehicle devices, and serves as the vehicle's interface with external networks. The original connected vehicle gateway on a vehicle is authenticated by the device or vehicle manufacturer during device or vehicle manufacturing process. New connected vehicle gateway device 310 installed on a vehicle can be either pre-authenticated or authenticated by an off-board authentication server when it can access the off-board authentication server. As a result of successful authentication, the connected vehicle gateway device 310 acquires all the necessary security materials it will need to communicate with other in-vehicle devices and to provide the onboard authentication proxy and the onboard key server functions.

In accordance with the embodiments herein, devices belonging to the third set of network devices 180 (Type-A) are authenticated by the onboard authentication proxy on the connected vehicle gateway device 310. Secure communication keys for the third set of network devices 180 (Type-A) are stored in a non-transient memory of the connected vehicle gateway device 310. Since the devices belonging to the third set of network devices 180 (Type-A) are powerful devices, relative to the first and second sets of network devices 160, 170 they may use any standard authentication protocols and algorithms to authenticate with the connected vehicle gateway device 310 as necessary or desired.

In accordance with the embodiments herein, one or more SCGs 360 are established to allow devices of diverse processing and communication capabilities to securely communicate with each other at different security levels and with different risk levels.

Overall, the embodiments herein provide a mechanism for enabling one or more groups of different types of devices, including devices that can only send but not receive messages, and devices that do not run IP protocols, to use different authentication mechanisms to authenticate themselves, and to use keys of different sizes and/or complexity to encrypt messages communicated between each other depending on the authentication and secure communication capabilities of each respective device. In the embodiments herein, in order that each device's traffic of encryption keys need not be sourced from a central key server thereby requiring the central key server to be always available, intermediate group keys or "Network Agnostic Secure Communication Group Keys" (NA-SCGKs) are established on each device upon its successful authentication. The NA-SCGKs thereby established are then used by the devices to generate their respective individual temporary integrity and confidentiality keys used to sign and encrypt outbound traffic from the device. This ensures that the security measures of the overall system 100 will continue to remain functional, even when the onboard key server 310 is unavailable.

With reference again to FIG. 3, as noted, the illustrated network 300 has several separately homogenous sub-networks 302, 304, 306, and 308 within an associated vehicle 10 wherein a selected one 310 of the third set of network devices 180 is functionally operable in the capacity of the apparatus 100 (FIG. 1) for authenticating a plurality of associated network devices having unequal communication capabilities described above in connection with FIG. 1. The illustrated embodiment demonstrates an example showing a manner in which one or more SCGs 360 are established to allow devices of diverse processing and communication capabilities to securely communicate with each other at different security levels and with different risk levels. In particular, the one or more SCGs 360 includes a first SCG 362 spanning the second locally homogenous sub-network 304, the gateway device 310, and the external associate device 301; a second SCG 364 spanning the fourth locally homogenous sub-network 308, the gateway device 310, and the internal switch or gateway device 330 of the second locally homogenous sub-network 304; and a third SCG 366 spanning the internal switch or gateway device 330 of the second locally homogenous sub-network 304, the gateway device 310, and the internal switch or gateway device 350 of the fourth locally homogenous sub-network 308.

In accordance with the embodiments herein, the SCGs 360 each comprise a set of associated network devices that are validated and authorized to securely communicate with each other. In addition, the SCGs 360 are functional in ways resulting in beneficial properties including for example a property that each SCG 362, 364, 366 can contain any combination of devices including devices of the first set (Type B) of associated network devices 160, devices of the second set (Type C) of associated network devices 170, and/or devices of the third set (Type A) of associated network devices 180. In addition to the above, the SCGs 360 typically include at least one device from the third set (Type A) of associated network devices 180 based on the strong communication and processing capabilities inherent in these devices.

In addition, any of the SCGs 360 can contain both onboard associated network devices relative to the associated vehicle 10, and off-board associated network devices relative to the associated vehicle 10. For example, the first SCG 362 spans the second sub-network 304, the gateway device 310, and the external associate device 301.

In further addition, associated network devices within any single SCG 360 selectively communicate with each other regardless of whether the associated network device is a device of the first 160, second 170 or third 180 set of associated network devices. Further, in accordance with the embodiments, associated network devices within any single SCG 360 selectively communicate with each other using different levels of security protection regardless of whether the associated network device is a device of the first 160, second 170 or third 180 set of associated network devices.

Still further in accordance with the embodiments herein, the SCGs 360 are independent of underlying network types and configurations. In this regard, as noted above and shown in the embodiment illustrated in FIG. 3, the second SCG 364 spans the second sub-network 304 configured in the example as a CAN, LIN, or other network type, and the fourth sub-network 308 configured in the example as an Ethernet network. Overall therefore, associated electronic devices in the same SCG 360 can be on or in different physical networks or on or in heterogeneous physical networks.

Still further in accordance with the embodiments herein, the SCGs 360 permit or otherwise enable each of the associated electronic devices 152 to be a member of multiple SCGs 360. An associated electronic device 152 can be a member of multiple SCGs 360 when, for example, it is a gateway that bridges traffic between multiple SCGs 360 or when different applications such as for example different software modules on the device need to communicate with applications (or software modules) in different SCGs 360 even when the device is not a gateway.

Still further in accordance with the embodiments herein, not all of the associated electronic devices 152 in the same SCG 360 such as for example the devices 332, 334, 336, in the first SCG 362 necessarily need to communicate with each other. For example, an ECU 332 with a sensor may be allowed to broadcast data to many other ECUs 334, 336, while only selected ECUs 336 will be allowed to send commands to actuator-equipped ECUs 334.

Yet still further in accordance with the embodiments herein, different SCGs 360 can have different levels of security. For example, the first SCG 362 can be assigned or otherwise implement a first level of security, the second SCG 364 can be assigned or otherwise implement a second level of security different than the first level of security, and the third SCG 366 can be assigned or otherwise implement a third level of security different than the first and second levels of security.

Still further in accordance with the embodiments herein, each SCG 362, 364, 366 is identified by a unique Secure Communication Group Identifier (SCG ID). Preferably, the one or more SCGs 360 formed relative to an associated vehicle 10 are determined and fixed at a design or manufacture phase of presentation of the subject apparatus 100 to or into the associated vehicle 10.

With continued reference to FIG. 3, several examples of SCGs 360 are shown wherein each SCG 362, 364, 366 of the illustrated embodiment consists of devices having significantly different communication and processing capabilities. One example, the first SCG 362, illustrates a manner in which a SCG consisting of both onboard and off-board (relative to the associated vehicle 10) devices, is operative to be used to constrain the subset of in-vehicle networks and devices that can be accessed by external systems. In addition, FIG. 3 illustrates another example feature of SCGs in accordance with the embodiments wherein any of the associated network devices 150 can participate in multiple SCGs such as for example the gateway switch device 330 is a member of both the first SCG 362 as well as the third SCG 366. Further in addition, FIG. 3 illustrates another example feature of SCGs in accordance with the embodiments wherein SCGs may be formed entirely of internal switch and gateway devices such as for example the third SCG 366 is comprised of the primary connected vehicle gateway device 310, the second and fourth switch or gateway devices 330, and 350 whereby messages may be securely communicated between these devices via the third SCG 366.

In addition to the above, in accordance with the embodiments herein, a physical local area network (LAN) such as for example the Ethernet network 308 shown in FIG. 3 is a special case of SCG, wherein all of the devices 350-356 in the SCG are on the same physical LAN, use the same link-layer security protocol, and have the same level of link-layer security protection.

A virtual LAN (VLAN) is also a special case of a SCG in accordance with further embodiments herein, where all devices in the VLAN SCG are on the same VLAN, use the same link-layer security protocol, and have the same level of link-layer security protection.

In accordance with the embodiments herein, broadly, the SCGs described enable different types of associated network devices 150 having vastly different communication and security processing capabilities and attached to different types of physical and/or virtual networks, to yet securely communicate with each other using protocols and achieving protection levels that match their capabilities and risk profiles.

Figure 4:
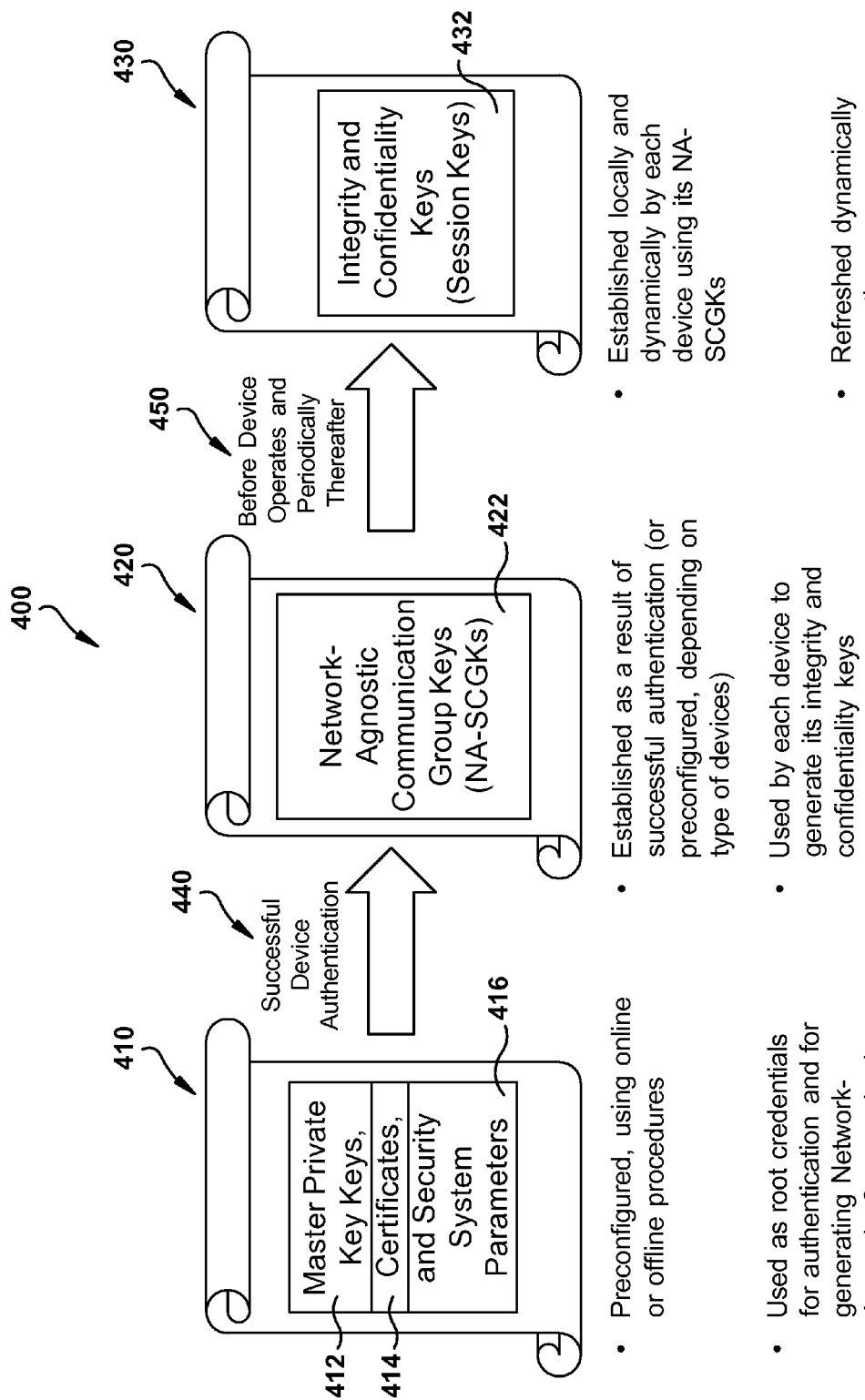
FIG. 4 is a simplified block diagram showing a security key hierarchy for the in-vehicle devices of FIG. 1.

FIG. 4 is a simplified block diagram showing a security key hierarchy 400 for the associated in-vehicle electronic devices 150 in the system illustrated in FIG. 1. With reference now to that Figure, each of the associated network devices 150 is preconfigured with a first data set 410 comprising for example data representative of master private keys 412, data representative of certificates 414, and data representative of security system parameters 416. The first data set 410 is preconfigured in the associated electronic devices 150 using online or offline resources or the like. In the example embodiment, the first data set 410 is a set of permanent keys used as root credentials to bootstrap its security operations. These can be, for example, a set of public-private key pairs and their certificates for Type-A devices of the third set of devices 180, and a set of private Master Private Keys for any other type of device among the first and second sets of devices 160, 170. Each device may also be provisioned with an authentication token preferably in the form of an encrypted data object that the device can use to authenticate itself with the on board authentication proxy logic 130 (FIG. 1). More particularly, the first data set 410 is used for authentication preferably in accordance with the procedures described above and for generating, at successful device authentication 440, a second data set 420 comprising in the example embodiment and as described above Network Agnostic Secure Group Communication Keys (SCGKs) 422.

In accordance with the example embodiment, the SCGKs 422 are keys used by a device to generate the session keys used for each SCG 360. A new device can establish the SCGKs 422 for its SCG 360 as part of a successful device authentication process. Alternatively, the onboard gateway key server 130 can distribute the SCGKs 422 to each newly authenticated device. Certain devices such as for example devices of the second set 170 are, in the example embodiment, preconfigured with all the SCGKs 422 they will need to use to generate or have generated integrity and confidentiality keys needed for secure communication.

In the embodiments herein, in order to ensure secure communication, each device needs to know the session keys 432 for communicating with each of its communication peers within a SCG 360. In the embodiments herein, each device does not need to first discover its communication peers and then perform a key agreement protocol with each peer to establish the session keys. These steps unnecessary in the example embodiments herein require every device to implement a peer discovery protocol and execute key establishment protocol with each peer, which can be impractical for many in-vehicle devices with highly constrained computing and communication capabilities. Rather, in the embodiments herein explicit peer discovery protocol is eliminated. The embodiments herein advantageously do not require a device to perform key establishment with each individual communication peer. Instead, each device establishes the SCGKs 422 as a result of its successful authentication with the onboard key server 130 and uses the SCGKs 422 to locally generate 450 its session keys 432. Preferably, the session keys 432 are generated 450 before the devices operate for secure communication and periodically thereafter.

Figure 5:
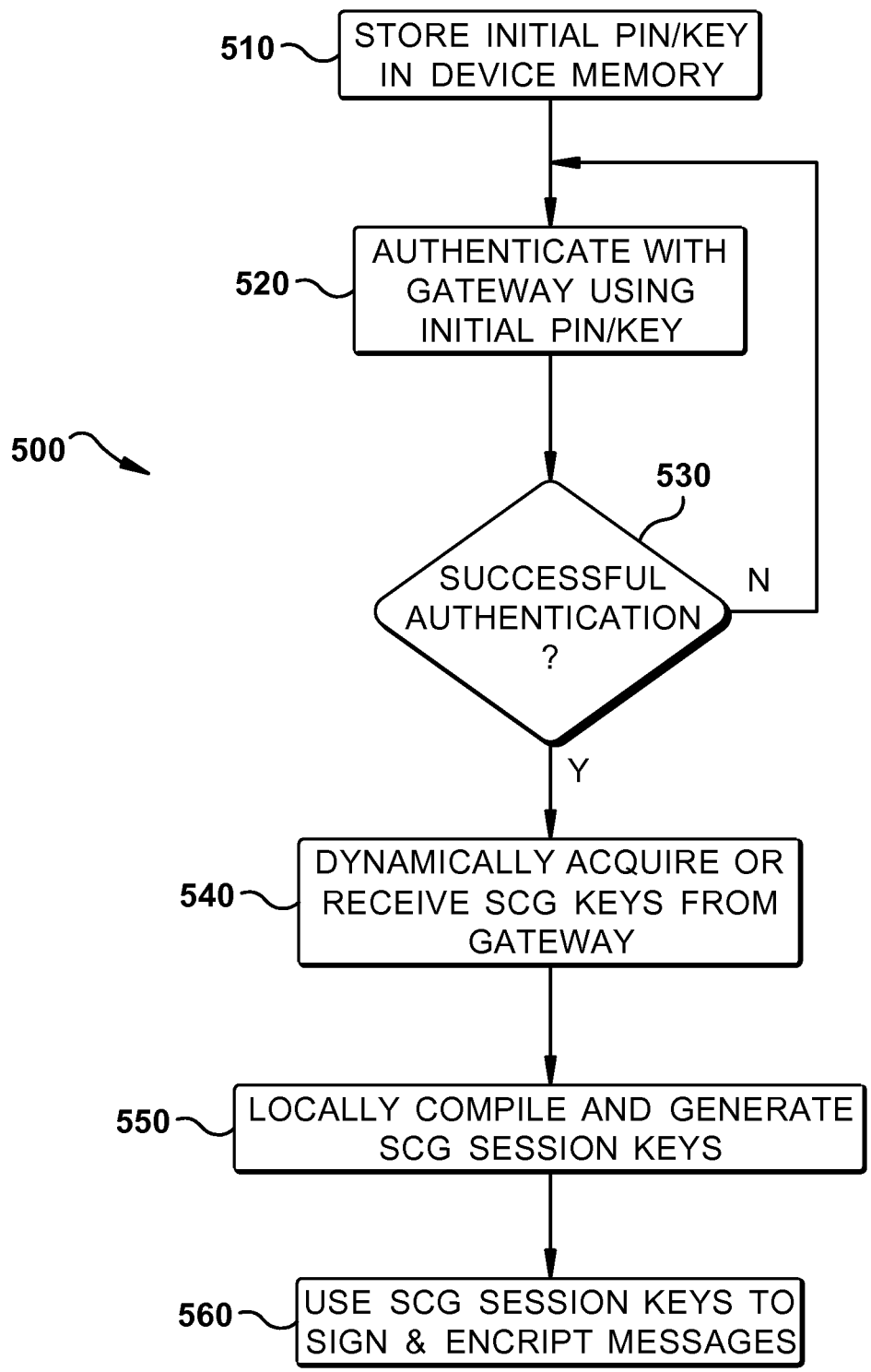
FIG. 5 is a flow diagram illustrating a sample procedure for authentication and secure key distribution for selected devices of the system of FIG. 1 capable of bi-directional communication.

FIG. 5 is a flow diagram illustrating a sample procedure for authentication and secure key distribution 500 for selected devices of the system of FIG. 1 capable of bi-directional communication. Initially, at 510, the first data set 410 is stored or otherwise provided in each of the associated network devices 150. The first data set 410 stored includes for example data representative of master private keys 412, data representative of certificates 414, and data representative of security system parameters 416. As noted above, the first data set 410 is preconfigured in the associated electronic devices 150 using online or offline resources or the like. Sophisticated devices such as devices of the third set 180 (Type A) of associated devices can be provided with less complicated or detailed initial key or PIN number information than less sophisticated devices such as devices of the second set 170 (Type C) of associated devices. In this regard, it is to be appreciated that devices of the third set 180 (Type A) of associated devices are capable of performing bidirectional communication with other devices of the third set 180 (Type A) for mutually negotiating the necessary security keys for operative communication with other devices in the SCGs 360. However, devices such as devices of the second set 170 (Type C) of associated devices do not have the same negotiation power and, accordingly, are provided with a session key 432 which may be stored in a non-transient memory on the device.

In step 520, each of the associated devices 150 authenticate or attempt to authenticate with the gateway device 130. If authentication is determined at 530 to be unsuccessful, the procedure for authentication and secure key distribution 500 returns to a step for attempting to authenticate the relevant device again. However, if authentication is determined at 530 to be successful, the procedure for authentication and secure key distribution 500 advances to a step 540 for each device capable of receiving data to dynamically acquire or otherwise receive their respective SCGKs 422. In an embodiment, the devices capable of receiving data dynamically acquire or otherwise receive their respective SCGKs 422 from the gateway device 310.

Figure 6:
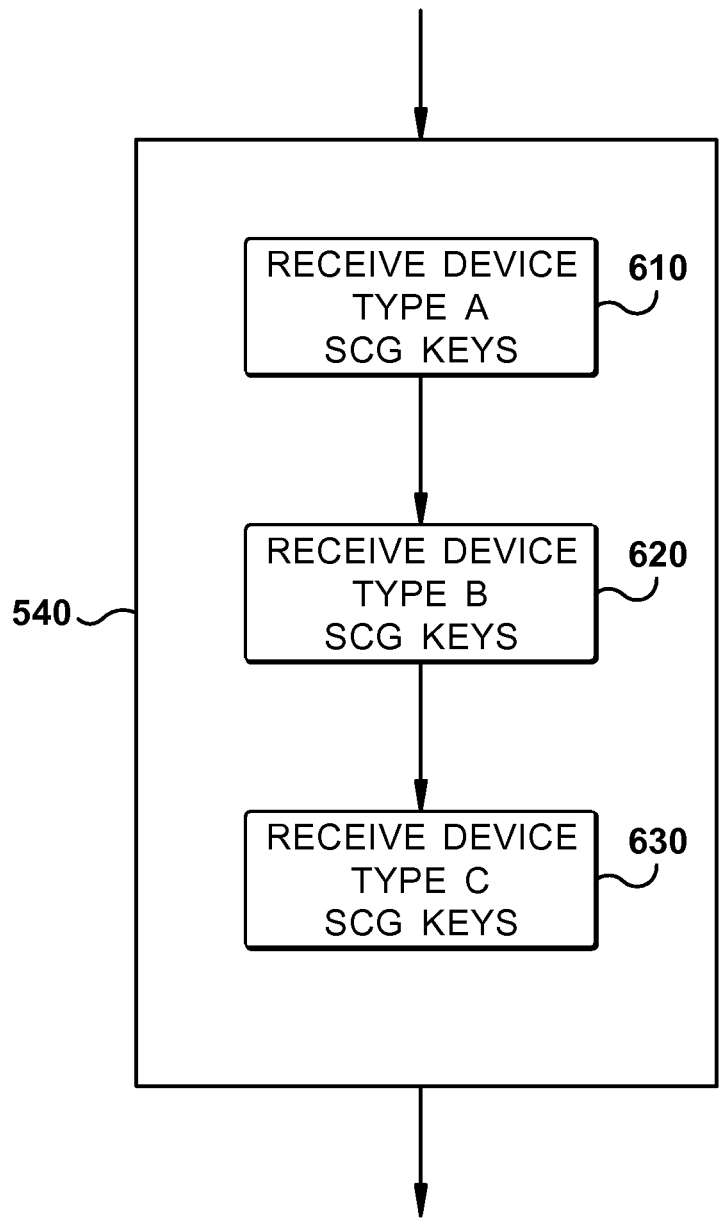
FIG. 6 is a simplified flow diagram illustrating a portion of the flow diagram of FIG. 5 relating to devices capable of bi-directional communication.

In other aspects of the embodiments, all of the SCGKs 422 that may be negotiated by the devices are collected by the gateway device 310 and stored thereat for later selective distribution to other devices as may be necessary or desired. In this regard, the step of SCGK acquisition and distribution 540 of FIG. 5 is shown in greater detail in FIG. 6 relative to associated devices of the first and third sets 160, 180. FIG. 6 is a simplified flow diagram illustrating a portion of the flow diagram of FIG. 5 relating to devices capable of bi-directional communication. As illustrated, each device capable of bidirectional communication selectively receives at 610 the SCGKs of the devices of the third set 180 (Type A). Similarly, each device capable of bidirectional communication selectively receives at 620 the SCGKs of the devices of the first set 160 (Type B). Further, each device capable of bidirectional communication selectively receives at 630 the SCGKs of the devices of the second set 160 (Type C).

With reference again to the procedure for authentication and secure key distribution 500 shown in FIG. 5, after SCGK acquisition and distribution and before the devices operatively securely communicate 450 (FIG. 4) in the SCGs 360, the devices locally compile and generate their respective session keys 432 at step 560. Again, it is to be appreciated that only devices capable of bidirectional communication receive or otherwise collaboratively determine their respective session keys 432 and that simple devices such as devices of the second set 170 (Type C) are, in accordance with the example embodiment, provided with one or more session keys during fabrication, initial programming, or installation of the device into the associated communication network 140 (FIG. 1). The gateway device 310 collects the session keys preconfigured on the simple devices such as those of the second set 170 (Type C), and then distributes the session keys to one or more other devices capable of bidirectional communication such as those of the first and second sets 160, 180 (Types B & C).

Figure 7:
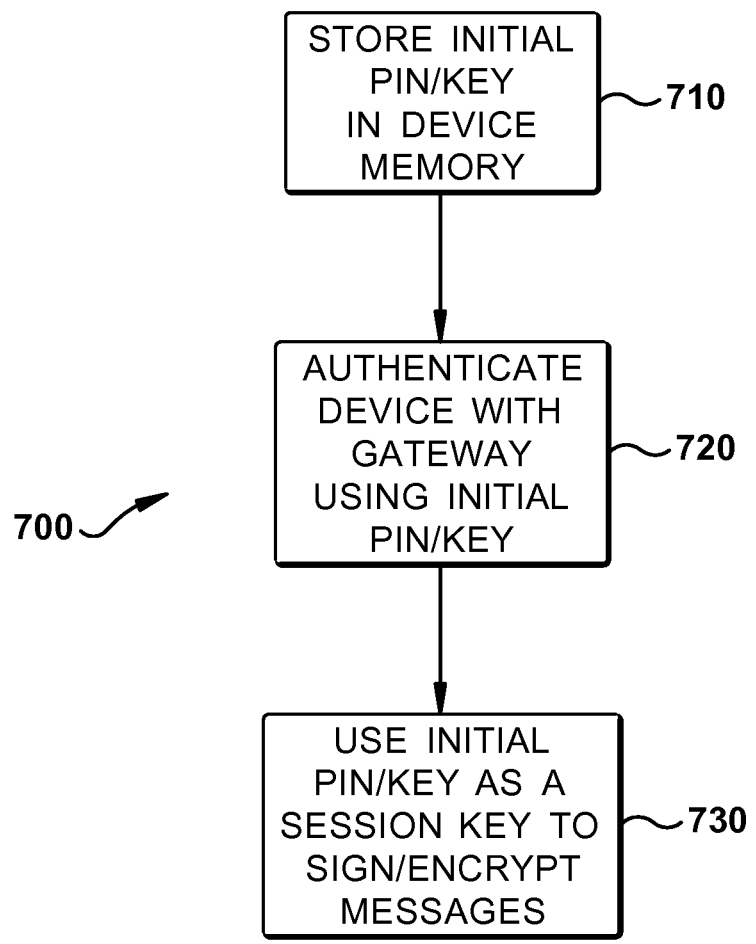
FIG. 7 is a flow diagram illustrating a method of authentication and secure communication key distribution for selected devices of the system of FIG. 1 capable of only unidirectional communication.

FIG. 7 is a flow diagram illustrating a sample procedure for authentication and secure key distribution 700 for selected devices of the system of FIG. 1 capable of only unidirectional communication. Initially, at 710, the first data set 410 is stored or otherwise provided in each of the associated network devices 150 capable of only unidirectional communication. The first data set 410 stored includes for example data representative of a session key and information for authenticating the devices capable of only unidirectional communication. As noted above, the first data set 410 is preconfigured in the associated electronic devices 150 using online or offline resources or the like, or is stored in a non-transient memory or the like.

In step 720, the selected devices capable of only unidirectional communication use the first data set 410 to authenticate with the gateway device 310. Thereafter, the devices capable of only unidirectional communication use the first data set 410 as session keys for secure communication within one or more SCGs 360.

Figure 8:
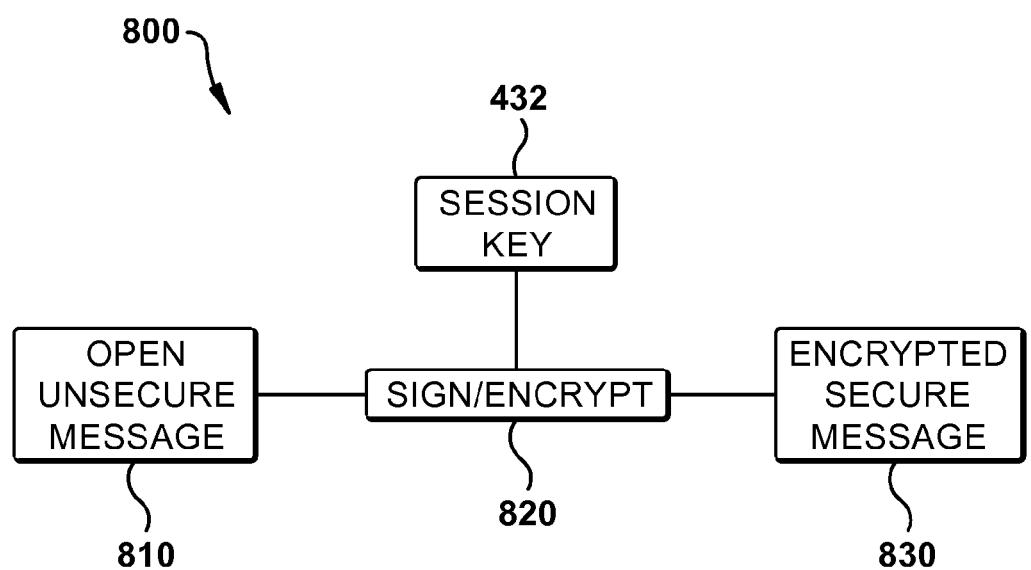
FIG. 8 is a functional block diagram illustrating the secure communication of a message using a secure communication group session key.

It is to be appreciated that, in the example embodiment, the session keys 432 are used to ensure secure communication within SCGs between member devices wherein the session keys 432 are used by the devices to sign or otherwise encrypt messages. In this regard FIG. 8 is a functional block diagram illustrating a functional flow 800 of secure communication of a message using a secure communication group session key. In general, open or otherwise unsecure or unencrypted messages 810 are signed or encrypted by encryption logic 820 of the gateway device 310 using a selected session key 432 acquired as described above. More particularly, devices of the first and third sets of devices 160, 180 (Types B & A) may negotiate SCGKs keys with each other using bidirectional communication or they may receive SCGKs from the gateway device 310 wherein the SCGKs are used by the devices of the first and third sets of devices 160, 180 (Types B & A) to locally and dynamically establish their respective session keys. In addition, in accordance with the embodiments herein, the unidirectional communication devices of the second set of devices 170 (Type C) are preconfigured with authentication data and session keys 432. In the embodiment illustrated, the encryption logic 820 signs the open unsecured message 810 to thereby form an encrypted message 830 capable of being securely communicated within the associated communication network 140 (FIG. 1). In this way, the messages that are encrypted by a device member of a first SCG is capable of being decrypted by only devices that are also members of the first SCG. Also in this way, messages may be securely communicated between heterogeneous devices.

FIG. 9 is a block diagram illustrating an example of a computer system 900 upon which an example embodiment can be implemented. Computer system 900 may be employed to implement the functionality of the authentication proxy logic 130 in the apparatus 100 in general, as well as the Connected Vehicle Gateway device 310 of the one or more associated vehicles 10.

Computer system 900 includes a bus 902 or other communication mechanism for communicating information and a processor 904 coupled with bus 902 for processing information. Computer system 900 also includes a non-transitory main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A non-transitory storage device 910, such as a magnetic disk, optical disk, and/or flash storage, is provided and coupled to bus 902 for storing information and instructions.

An aspect of the example embodiment is related to the use of computer system 900 for authenticating devices having unequal capabilities. A further aspect of the example embodiment is related to the use of computer system 900 for authenticating devices having unequal capabilities such as for example in-vehicle electronic devices having varying different communication and processing capabilities. According to an example embodiment, these functionalities are provided by computer system 900 in response to the processor 904 executing one or more sequences of one or more instructions contained in the non-transitory main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry or to any specific combination of hardware circuitry with software.

The term "computer-readable medium" as used herein refers to any non-transitory medium that participates in providing instructions to processor 904 for execution. Such a medium may take many forms, including but not limited to non-volatile media, and volatile media. Non-volatile media include for example optical or magnetic disks, such as storage device 910. Volatile media includes dynamic non-transitory memory such as main memory 906. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 904 for execution. For example, the instructions may initially be borne on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906 from which processor 904 retrieves and executes the instructions. The instructions received by main memory 606 may optionally be stored on storage device 910 either before or after execution by processor 904.

Computer system 900 also includes a first communication interface 920 operatively coupled with the bus 902. Communication interface 920 provides a two-way data communication coupling computer system 900 with a communication link 930. For example, communication interface 920 may be a local area network (LAN) card to provide a data communication connection to a compatible LAN such as for example a Controller Area Network (CAN) network. As another example, communication interface 920 may be an integrated services digital network (ISDN) card or a modem to provide a data communication connection to a corresponding type of telephone line. Wireless links may also be implemented. In any such implementation, communication interface 920 sends and receives electrical, electromagnetic, or optical signals that carry digital data streams representing various types of information.

In view of the foregoing structural and functional features described above, methodologies in accordance with the example embodiments herein will be better appreciated with reference to FIGS. 10a-11c. While, for purposes of simplicity of explanation, the methodologies of these figures are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

Overall, the SCGs 360 of the example embodiment efficiently enables two or more devices on different networks to easily communicate securely through one or multiple internal switches via either neighbor-to-neighbor or end-to-end security protections. In this regard and with reference first to FIG. 10a, a flow diagram illustrating a sample procedure 1000 for secure neighbor-to-neighbor communications will be described. The embodiment shown provides a secure message exchange between electronic devices having unequal communication capabilities through internal switches and gateways of the system of FIG. 1 using a neighbor-to-neighbor secure communication topology.

Figure 10A:
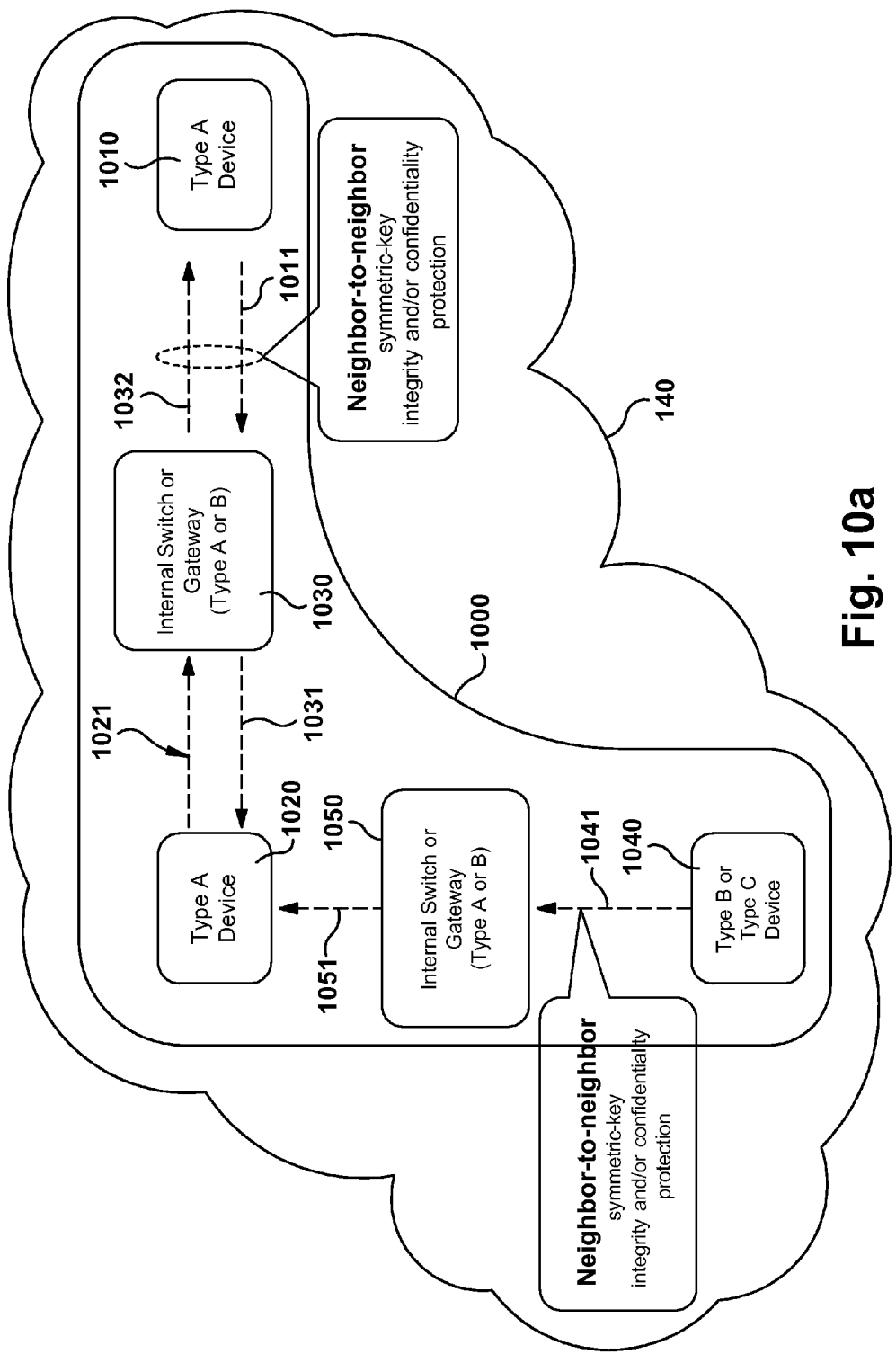
FIG. 10a is a flow diagram illustrating a secure message exchange between electronic devices through internal switches and gateways of the system of FIG. 1 using a neighbor-to-neighbor secure communication model.

For illustrating the general functionality of the example embodiment relative to secure message exchange between in-vehicle devices using neighbor to neighbor confidentiality protection through internal switches and gateways, all of the components illustrated in FIG. 10a are assumed to reside within the associated communication network 140. Also, all of the devices are members of the SCG 1000. The components include, in the example, a first device 1010 in operative communication with a second device 1020 via an internal switch or gateway device 1030. In addition, the second device 1020 is in operative communication with a third device 1040 via a second internal switch or gateway device 1050. Further in the example, for purposes of describing the embodiments, the first device 1010 is in a first network such as an Ethernet network, the second device 1020 is in a second network such as a CAN network, and the third device 1040 is in a third network such as a LIN network. Again, however, in the example embodiment, all of the devices are members of a common first SCG 1000.

With neighbor to neighbor message security, as illustrated in FIG. 10a, the source device signs and encrypts its messages to the closest switch, which verifies or decrypts the messages and then signs and encrypts the messages using its own keys to the next hop mode. This implies that the internal switches need to know the session keys of the neighboring devices and further, need to implement symmetric key integrity and/or confidentiality protection functions. Accordingly, a first message 1041 from the third device 1040 is signed with the session key of the third device and the second switch device 1050 decrypts the message using a session key of the second switch device 1050. Similarly, messages exchanged between the first device 1010 and the first switch 1030 are first signed with the SCG's session keys of the transmitting device. Essentially, each of the messages 1041, 1051, 1021, 1031, 1011 and 1032 are signed or otherwise encrypted between hops.

Figure 10B:
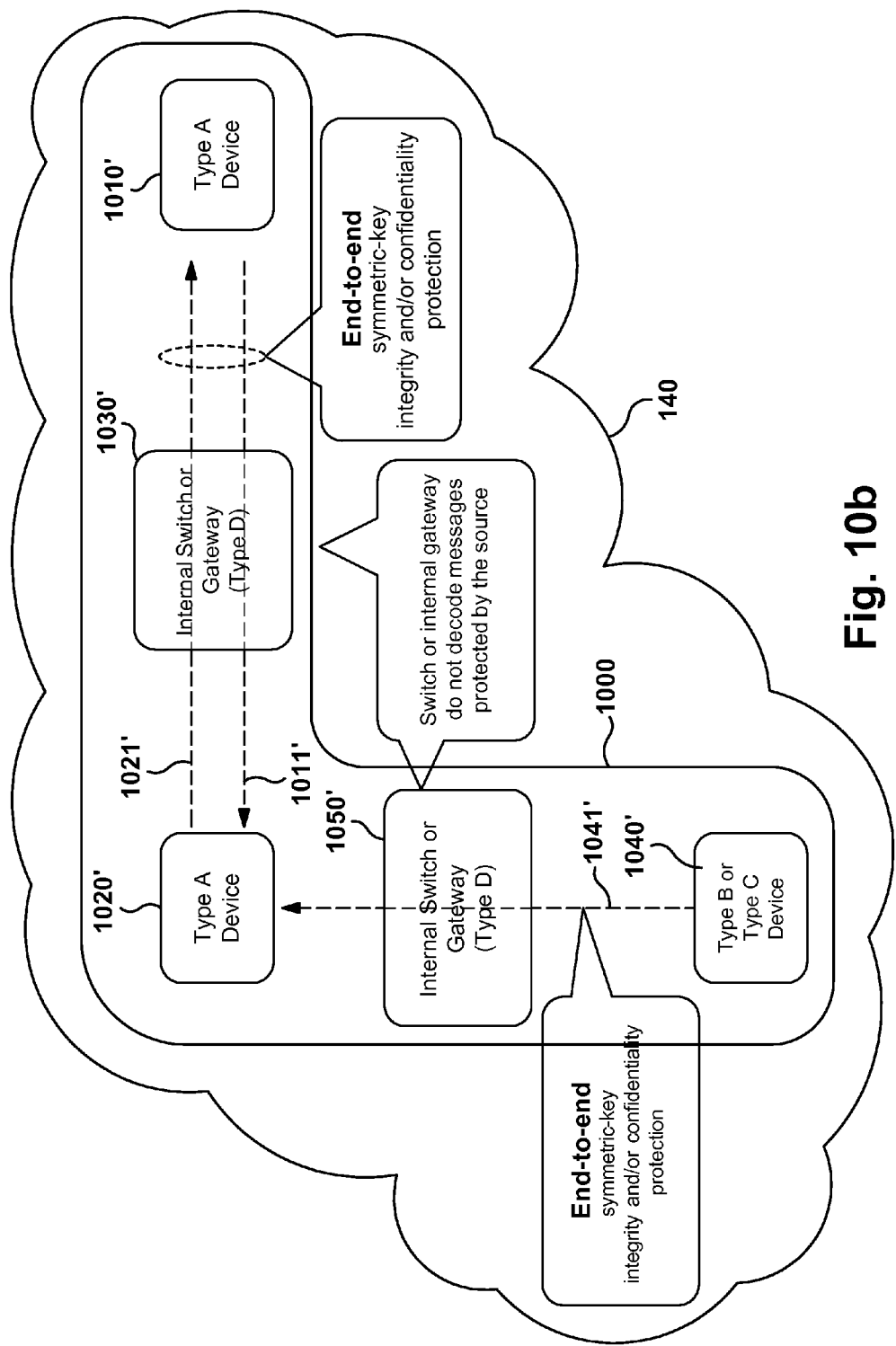
FIG. 10b is a flow diagram illustrating a secure message exchange between electronic devices through internal switches and gateways of the system of FIG. 1 using an end-to-end secure communication model

FIG. 10b is a flow diagram illustrating a secure message exchange between electronic devices through internal switches and gateways of the system of FIG. 1 using an end to end secure communication model. With end to end message security, as illustrated in FIG. 10b, the secure device signs/or encrypts its messages to the destination device. The intermediate switches do not verify or decrypt these messages and hence, do not need to know the session keys of neighboring devices and, further do not need to implement cryptographic functions.

For illustrating the general functionality relative to secure message exchange between in-vehicle devices using end to end confidentiality projection through internal switches and gateways as illustrated in FIG. 10b, all of the components are assumed to reside within the associated communication network 140. Also, all of the devices are members of the SCG 1000. New components include, in the example, a first device 1010' in operative communication with a second device 1020' via an internal switch or gateway device 1030'. In addition, the second device 1020' is in operative communication with a third device 1040' via a second internal switch or gateway device 1050'. Further in the example, for purposes of describing the embodiment, the first device 1010' is in a first network such as an ethernet network, the second device 1020' is in a second network such as a CAN network, and the third device 1040' is in a third network such as a LIN network. Again, however, all of the devices are members of a common first SCG 1000'.

Accordingly, a first message 1041' from the third device 1040' is signed with the session key of the third device and transmitted to the first device and transmitted to the first device 1010' via the second switch device 1050', the second device 1020', and the first switch device 1030', essentially without decryption or any other material modification. More particularly, in the embodiments illustrated, the devices 1050', 1020', and 1030' are operative to perform only switching functions and no crypto or security functions on the message 1041'.

After the first device 1010' receives the message 1041' encrypted using the session key of the third device 1040' it is decrypted using the session key of the first device 1010'.

Figure 11A:
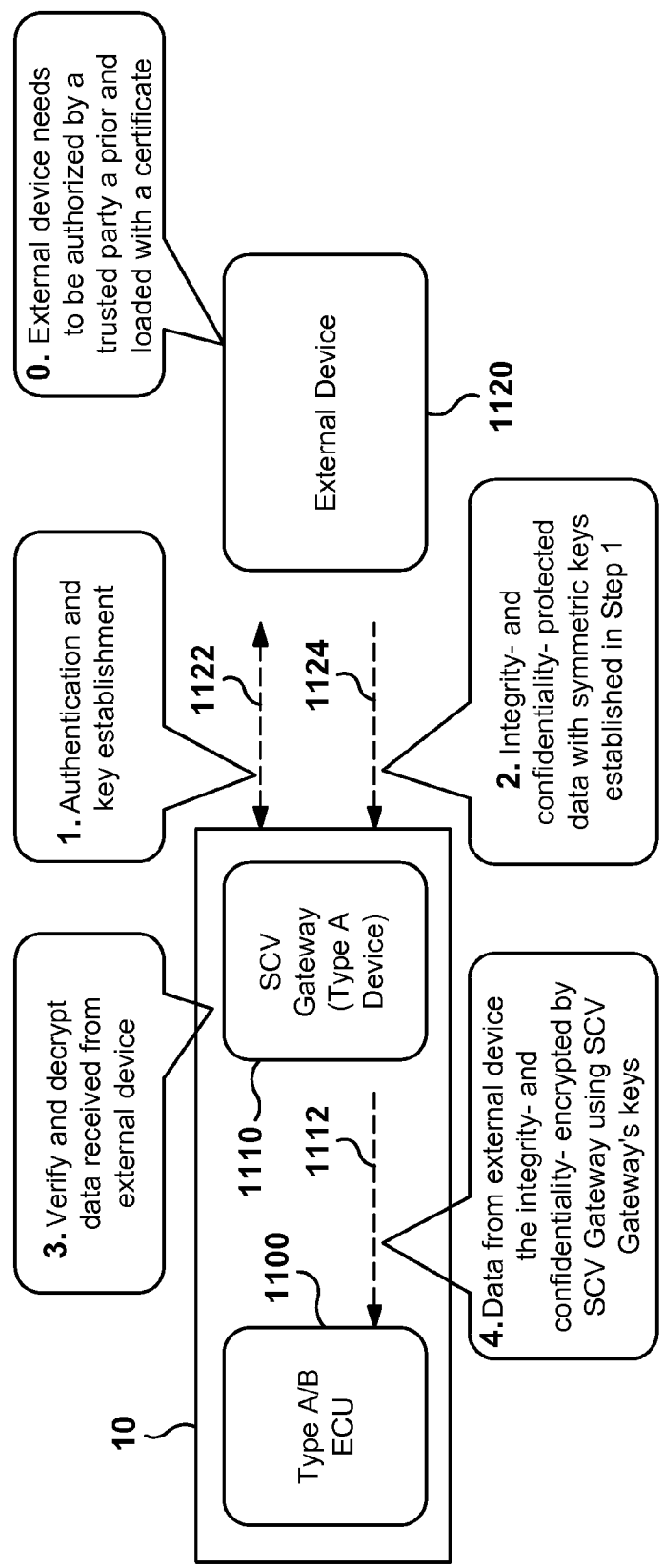
FIG. 11a is a flow diagram illustrating a secure message exchange between an in-vehicle device of the system of FIG. 1 with an associated external device using a neighbor-to-neighbor or a hop-to-hop secure communication model.
Figure 11B:
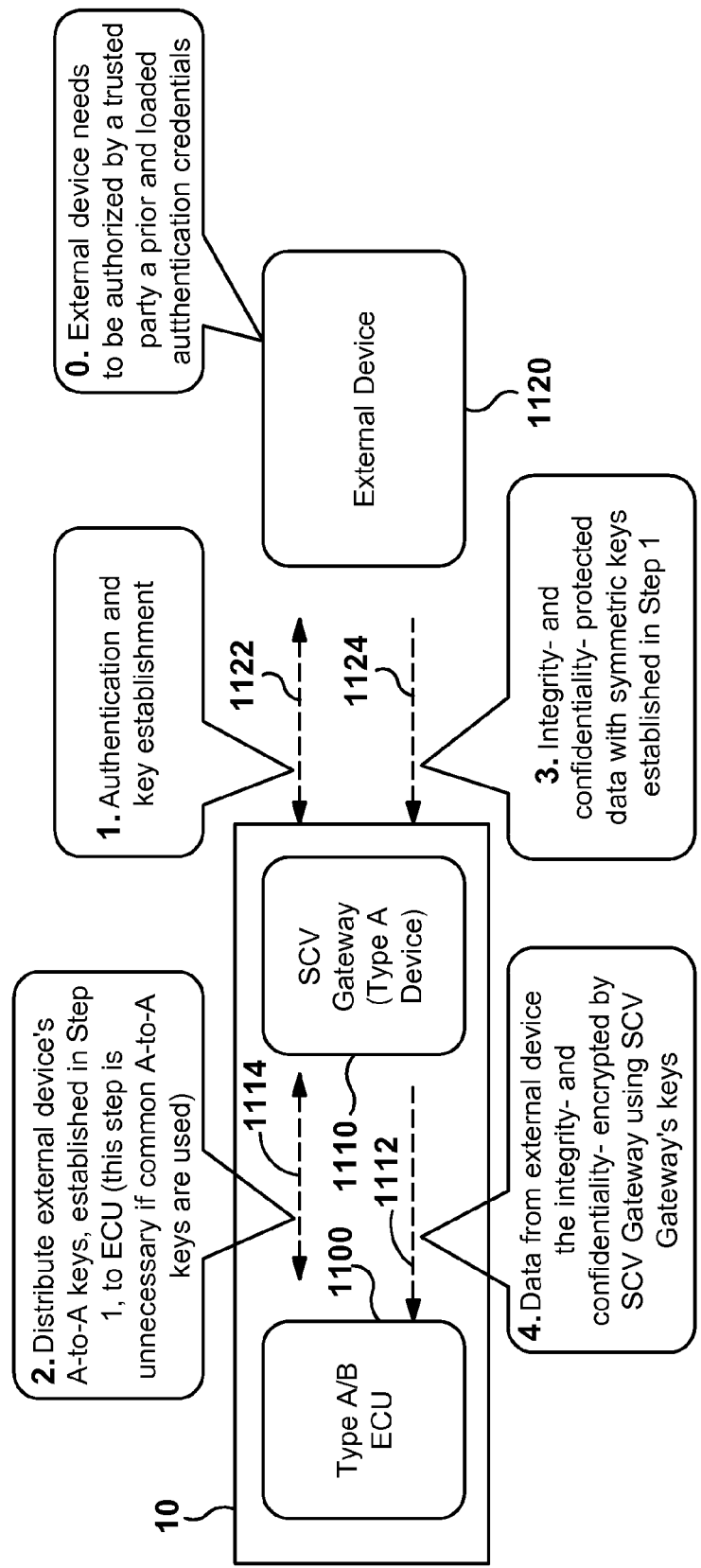
FIG. 11b is a flow diagram illustrating a secure message exchange between an in-vehicle device of the system of FIG. 1 with an associated external device using an end-to-end secure communication model.

The SCGs of the example embodiments can support several ways for controlling the access by an external device to an in-vehicle device as exemplified in FIGS. 11a, 11b, and 11c. FIG. 11a is a flow diagram illustrating a secure message exchange between an in-vehicle device of the system of FIG. 1 with an associated external device using a neighbor-to-neighbor or a hop-to-hop secure communication model.

FIG. 11a shows that an external Type-A, Type-B, or Type-C device can authenticate with the SCV Gateway. As part of a successful authentication, the external device and the SCV Gateway will establish session keys for securing data exchanged between them. The external device then signs and/or encrypts its data to the SCV Gateway. The SCV Gateway verifies and decrypts the data and then passes on the data to the destination ECU, protected with its own session keys.

In the system of the embodiment illustrated in FIG. 11a, a network device 1100 and a gateway device 1110 are disposed within an associated vehicle 10, and an external device 1120 is disposed outside of or removed from the associated vehicle 10. For the sake of the example, it is assumed that the external device 1120 has been authorized by a trusted party a prior and loaded or otherwise provided with a certificate.

At 1122, the external device 1120 and the in-vehicle gateway 1110 authenticate the device 1120 and establish a set of secure communication keys. Then, using the set of secure communication keys, the external device 1120 signs or otherwise encrypts data sent at 1124 to the in-vehicle gateway 1110.

The in-vehicle gateway 1110 receives the encrypted data message 1124 and decrypts it to verify that the message contains no malware or the like. Once the integrity of the decrypted message is verified, the gateway device 1110 encrypts the message using encryption keys of the gateway device for delivery to the in-vehicle device 1100 in an encrypted form as an encrypted message 1112.

In the system of the embodiment illustrated in FIG. 11b, a network device 1100 and a gateway device 1110 are disposed within an associated vehicle 10, and an external device 1120 is disposed outside of or removed from the associated vehicle 10. For the sake of the example, it is assumed that the external device 1120 has been authorized by a trusted party a prior and loaded or otherwise provided with a certificate.

At 1122, the external device 1120 and the in-vehicle gateway 1110 authenticate the device 1120 and establish a set of secure communication keys. Then, using the set of secure communication keys, the external device 1120 signs or otherwise encrypts data sent at 1124 to the in-vehicle gateway 1110.

The in-vehicle gateway 1100 receives the encrypted data message 1124 and passes it along directly to the in-vehicle device 1100. The in-vehicle gateway 1100 also passes along to the in-vehicle device 1100 at 1114 the secure communication keys of the external device 1120 established at 1122. In that way, the gateway device 1110 is relieved of the burden of decrypting then re-encrypting the data from the external device 1120.

In the system of the embodiment illustrated in FIG. 11c, a network device 1100 and a gateway device 1110 are disposed within an associated vehicle 10, and an external device 1120 is disposed outside of or removed from the associated vehicle 10. For the sake of the example, it is assumed that the external device 1120 has been authorized by a trusted party a prior and loaded or otherwise provided with a certificate.

At 1122, the external device 1120 and the in-vehicle gateway 1110 authenticate the device 1120 and establish a set of secure communication keys. Then, using the set of secure communication keys, the external device 1120 signs or otherwise encrypts data sent at 1124 to the in-vehicle gateway 1110.

In this example, the authentication access control is combined with data. Essentially, explicit authentication with the gateway device 1110 is eliminated in the example. Thus, the external device 1120 is permitted to simply begin data messages to the in-vehicle device 1100 via the gateway 1110 without explicit authentication. In the example, the gateway, performs an implicit authentication by examining the data. For example, the gateway device 1110 in one example verifies the signatures on the data of the message 1124 directly. When the signatures are verified by the gateway device 1100, the system implies a verification of the signatures being from an authorized party. In other words, when the signature of the message 1124 is verified by the gateway device 1110, the sending party, namely the external device 1120, is presumed to be authentic.

Once the signature is verified, i) the encrypted message can be forwarded directly to the in-vehicle device 1100 at 1112, or ii) the data is decrypted then sent to the in-vehicle device 1100 at 1112.

New security key management and secure communication methods that can secure the communication among in-vehicle devices with vastly different communication and processing capabilities when 1) some devices can only send but not receive messages, some devices can only perform symmetric-key cryptographic operations but not public-key algorithms, and many devices do not support IP protocols, 2) the diverse devices are also on different types of in-vehicle networks such as CAN, LIN, MOST, and Ethernet, and 3) the vehicle does not have network connectivity to external security systems. The example embodiments also address how an external device can securely communicate with in-vehicle devices connected on the same or different network.

Overall, the embodiments enable devices with diverse capabilities on different types of networks to securely communicate with each other while allowing each device's security protection level and security processing burden to match its capability and risk profile. The embodiments herein provide a significant improvement over systems providing security for specific types of networks or applications wherein the embodiments support secure communication in all types of in-vehicle networks. In the embodiments, there is no requirement that devices on the same physical or virtual LAN need to use the same security protocol and hence have the same security level regardless of the devices' capabilities. Rather, in the embodiments herein, the security level of each of the devices is based on the device's communication and processing capability.

Yet still further, the embodiments allow the security capabilities of in-vehicle networks to grow and scale easily without changing the security architecture or protocols. For example, Type-B devices can be replaced with Type-A devices, Type-C devices can be replaced with Type-B or Type-A devices in newer vehicle models or by retrofitting on existing vehicles without changing the security system and methods or changing other devices. Upgrading the security levels on a physical or virtual local area network does not require upgrading the security capabilities on all devices on the same network. Yet still in addition, the embodiments allow secure communication between in-vehicle devices with pre-authenticated external devices.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A gateway apparatus supporting differentiated secure communications among heterogeneous electronic devices, the gateway apparatus comprising:
   a first communication port configured to communicate via an associated first communication network of a first network type with a first associated device having a first secure communication capability, the first communication port further being configured to communicate via an associated second communication network of a second network type different than the first network type with a second associated device having a second secure communication capability different than the first secure communication capability; and
   gateway logic operatively coupled with the first communication port;
   wherein the gateway logic selectively authenticates the first associated device for group membership into a first Secure Communication Group (SCG);
   wherein the gateway logic selectively authenticates the second associated device for group membership into the first SCG;
   wherein the gateway logic selectively communicates Secure Communication Group Keys (SCGKs) to the first associated device having the first secure communication capability and to the second associated device having the second secure communication capability for generating session keys by the first and second associated devices for mutual secure communication in accordance with the group membership of the first and second associated devices in the first SCG.

2. The gateway apparatus according to claim 1, wherein:
   the gateway logic selectively authenticates the first associated device for group membership into the first SCG according to the first authentication capability by a unidirectional communication from the first associated device; and
   wherein the gateway logic selectively authenticates the second associated device for group membership into the first SCG according to the second authentication capability by a bidirectional communication with the second associated device.

3. The gateway apparatus according to claim 2, wherein:
   wherein the gateway logic selectively authenticates the first associated device for group membership into the first SCG according to the first authentication capability by: receiving key data from the first associated device via the first communication port, the key data being representative of a root credential of the first associated device; and verifying the key data relative to a predetermined set of authorization key data stored in a non-transient memory of the gateway apparatus; and
   wherein the gateway logic selectively authenticates the second associated device for group membership into the first SCG according to the second authentication capability by bidirectional cryptographic communication between the gateway logic and the second associated device.

4. The gateway apparatus according to claim 3, wherein:
   the gateway logic selectively distributes to the second associated device the key data of the first associated device as session keys of the first associated device for use by the second associated device together with session keys of the second associated device to establish secure communication with the first associated device.

5. The gateway apparatus according to claim 4, wherein:
   the gateway logic selectively authenticates a third associated device for group membership into the first SCG;
   the gateway logic selectively communicates SCGKs of the third associated device to the second associated device;
   the gateway logic selectively communicates the SCGKs of the second associated device having a bidirectional communication capability to the third associated device;
   the gateway logic selectively communicates the session keys of the first associated device having a unidirectional communication capability to the third associated device.

6. The gateway apparatus according to claim 5, wherein:
   the gateway logic receives an encrypted message from the third associated device directed to the second associated device;
   the gateway logic selectively decrypts the encrypted message from the third associated device using session keys of the third associated device and encrypts the message as a re-encrypted message using session keys of the second associated device;

and the gateway logic sends the re-encrypted message to the second associated device.

7. The gateway apparatus according to claim 6, wherein:
the first communication port is configured to communicate via the associated first communication network of the first network type wherein the first network type is a CAN network type; and
the second communication port is configured to communicate via the associated second communication network of the second network type, wherein the second network type is an Ethernet network type.

8. A method of supporting differentiated secure communications among heterogeneous electronic devices, the method comprising:
communicating by a communication port of a gateway apparatus via an associated first communication network of a first network type with a first associated device having a first secure communication capability;
communicating by the communication port of the gateway apparatus via an associated second communication network of a second network type different than the first network type with a second associated device having a second secure communication capability different than the first secure communication capability;
selectively authenticating by the gateway logic the first associated device for group membership into a first Secure Communication Group (SCG);
selectively authenticating by the gateway logic the second associated device for group membership into the first SCG;
selectively communicating by the gateway logic Secure Communication Group Keys (SCGKs) to the first associated device having the first secure communication capability and to the second associated device having the second secure communication capability for locally generating by the first and second associated devices session keys for mutual secure communication in accordance with the group membership of the first and second associated devices in the first SCG.

9. The method according to claim 8, wherein:
the selectively authenticating the first associated device comprises selectively authenticating the first associated device for group membership into the first SCG according to the first authentication capability by a unidirectional communication from the first associated device; and
the selectively authenticating the second associated device comprises selectively authenticating the second associated device for group membership into the first SCG according to the second authentication capability by a bidirectional communication with the second associated device.

10. The method according to claim 9, wherein:
the selectively authenticating the first associated device comprises: receiving key data from the first associated device via the first communication port, the key data being representative of a root credential of the first associated device; and verifying the key data relative to a predetermined set of authorization key data stored in a non-transient memory of the gateway apparatus; and
the selectively authenticating the second associated device comprises bidirectional cryptographic communication between the gateway logic and the second associated device.

11. The method according to claim 10, further comprising:
selectively distributing, by the gateway logic to the second associated device, the key data of the first associated device as session keys of the first associated device for use by the second associated device together with session keys of the second associated device to establish secure communication with the first associated device.

12. The method according to claim 11, further comprising:
selectively authenticating a third associated device for group membership into the first SCG;
selectively communicating SCGKs of the third associated device to the second associated device;
selectively communicating the SCGKs of the second associated device having a bidirectional communication capability to the third associated device; and
selectively communicating the session keys of the first associated device having a unidirectional communication capability to the third associated device.

13. The method according to claim 12, further comprising:
receiving by the gateway logic an encrypted message from the third associated device directed to the second associated device;
selectively decrypting by the gateway logic the encrypted message from the third associated device using session keys of the third associated device and encrypting the message as a re-encrypted message using session keys of the second associated device;
sending, by the gateway logic the re-encrypted message to the second associated device.

14. The method according to claim 13, wherein:
the communicating via the associated first communication network of the first network type comprises communicating via a CAN network type; and
the communicating via the associated second communication network of the second network type comprises communicating via an Ethernet network type.

15. Logic encoded in one or more tangible non-transient computer readable media for execution by an associated processor and when executed by the associated processor the logic being operable to:
communicate by a communication port of a gateway apparatus via an associated first communication network of a first network type with a first associated device having a first secure communication capability;
communicate by the communication port of the gateway apparatus via an associated second communication network of a second network type different than the first network type with a second associated device having a second secure communication capability different than the first secure communication capability;
selectively authenticate by the gateway logic the first associated device for group membership into a first Secure Communication Group (SCG);
selectively authenticate by the gateway logic the second associated device for group membership into the first SCG;
selectively communicate by the gateway logic Secure Communication Group Keys (SCGKs) to the first associated device having the first secure communication capability and to the second associated device having the second secure communication capability for locally generating by the first and second associated devices session keys for mutual secure communication in accordance with the group membership of the first and second associated devices in the first SCG.

16. The logic according to claim 15, wherein:
the logic is operable to selectively authenticate the first associated device for group membership into the first SCG according to the first authentication capability by a unidirectional communication from the first associated device; and the logic is operable to selectively authenticate the second associated device for group membership into the first SCG according to the second authentication capability by a bidirectional communication with the second associated device.

17. The logic according to claim 16, wherein:

the logic selectively authenticating the first associated device comprises: the logic being operable to receive key data from the first associated device via the first communication port, the key data being representative of a root credential of the first associated device; and the logic being operable to verifyg the key data relative to a predetermined set of authorization key data stored in a non-transient memory of the gateway apparatus; and the logic being operable to selectively authenticate the second associated device comprises the logic being operable to execute bidirectional cryptographic communication between the gateway logic and the second associated device.

18. The logic according to claim 17, being further operable to:

selectively distribute, by the gateway logic to the second associated device, the key data of the first associated device as session keys of the first associated device for use by the second associated device together with session keys of the second associated device to establish secure communication with the first associated device.

19. The logic according to claim 18, being further operable to:

selectively authenticate a third associated device for group membership into the first SCG;

selectively communicate SCGKs of the third associated device to the second associated device;

selectively communicate the SCGKs of the second associated device having a bidirectional communication capability to the third associated device; and selectively communicate the session keys of the first associated device having a unidirectional communication capability to the third associated device.

20. The logic according to claim 19, being further operable to:

receive by the gateway logic an encrypted message from the third associated device directed to the second associated device;

selectively decrypt by the gateway logic the encrypted message from the third associated device using session keys of the third associated device and encrypting the message as a re-encrypted message using session keys of the second associated device; and send, by the gateway logic the re-encrypted message to the second associated device.

21. The logic according to claim 20, wherein:

the communicating via the associated first communication network of the first network type comprises communicating via a CAN network type; and the communicating via the associated second communication network of the second network type comprises communicating via an Ethernet network type.

\* \* \* \* \*